(12) United States Patent
So et al.

(10) Patent No.: US 12,457,008 B2
(45) Date of Patent: Oct. 28, 2025

(54) METHOD AND DEVICE FOR CONFIGURING TIME BLOCK STRUCTURE FOR UWB COMMUNICATION

(71) Applicant: Samsung Electronics Co., Ltd., Suwon-si (KR)

(72) Inventors: Youngwan So, Suwon-si (KR); Mingyu Lee, Suwon-si (KR); Jonghoe Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 18/347,957

(22) Filed: Jul. 6, 2023

(65) Prior Publication Data

US 2024/0014851 A1    Jan. 11, 2024

(30) Foreign Application Priority Data

Jul. 6, 2022 (KR) .................. 10-2022-0083385
Jul. 11, 2022 (KR) .................. 10-2022-0085113
Jan. 9, 2023 (KR) .................. 10-2023-0003139

(51) Int. Cl.
H04B 1/71 (2011.01)
G01S 13/76 (2006.01)
H04B 1/7163 (2011.01)

(52) U.S. Cl.
CPC ........ *H04B 1/71632* (2013.01); *G01S 13/765* (2013.01)

(58) Field of Classification Search
CPC .................. H04B 1/71632; G01S 13/765
See application file for complete search history.

(56) References Cited

U.S. PATENT DOCUMENTS

| | | | |
|---|---|---|---|
| 11,617,128 B2 * | 3/2023 | Rune .................. | H04W 48/10 370/328 |
| 2017/0056721 A1 | 3/2017 | Stelfox et al. | |
| 2018/0219649 A1 * | 8/2018 | Ying .................. | H04W 76/27 |
| 2021/0044420 A1 | 2/2021 | Lee et al. | |
| 2021/0173066 A1 | 6/2021 | Yoon et al. | |
| 2022/0082676 A1 * | 3/2022 | Lee .................. | G01S 13/878 |

FOREIGN PATENT DOCUMENTS

WO    WO-2020164102 A1 *    8/2020    ............... H04L 1/08

OTHER PUBLICATIONS

Li Sun et al., Interference detection for high-integrity ranging in UWB systems: Part I (the updated version of the contribution Integrity protection to support secure ranging in IR-UWB), IEEE802.15-22-0072-02, Mar. 15, 2022.

(Continued)

*Primary Examiner* — Freshteh N Aghdam
(74) *Attorney, Agent, or Firm* — Jefferson IP Law, LLP

(57) ABSTRACT

A method and a device for configuring a time block structure are provided. A method performed by a controller in a communication system supporting ranging is provided. The method includes generating a ranging control message (RCM) including configuration information on a hyper block structure, and transmitting, to at least one controlee, the ranging control message, wherein the hyper block structure has a repeated pattern of a hyper block which is a group of ranging blocks.

20 Claims, 30 Drawing Sheets

(56) References Cited

OTHER PUBLICATIONS

Kuan Wu et al., MAC considerations on unified control for UWB sensing and ranging, IEEE802.15-22-0255-00, May 10, 2022.
Bin Qian et al., Simultaneous ranging solutions, IEEE 802.15-22-0254-00, May 10, 2022.
International Search report dated Oct. 12, 2023, issued in International Application No. PCT/KR2023/009508.
P802.15.4z™M/D02 Draft Standard for Low-Rate Wireless Networks; Amendment: Enhanced Ultra Wide-Band (UWB) Physical Layers (PHYs) and Associated Ranging Techniques, LAN/MAN Standards Committee of the IEEE Computer, Aug. 20, 2019, pp. 1-171, XP068154559.
Extended European Search Report dated Aug. 11, 2025, issued in European Application No. 23835829.5.

\* cited by examiner

| Frame Control | Sequence Number | Destination Address | Source Address | Auxiliary Security Header | Header IE (s) | Payload IE (s) | FCS |
|---|---|---|---|---|---|---|---|
| MAC header ||||| | MAC payload | MAC footer |

FIG. 2

| Field | Bits |
|---|---|
| Multi Node Mode | 0-1 |
| Ranging Round Usage | 2-3 |
| STS Packet Config | 4-5 |
| Schedule Mode | 6 |
| Deferred Mode | 7 |
| Time Structure Indicator | 8 |
| RCM Validity Rounds | 9-14 |
| MMRCR | 15 |
| Content Control | Octets: 1 |
| Ranging Block Duration | 0/3 |
| Ranging Round Duration | 0/1 |
| Ranging Slot Duration | 0/2 |
| Session ID | 0/4 |

FIG. 6A

| Field | Bits |
|---|---|
| Relative Ranging Block Index | 1 |
| Updated Block Duration | 3 |
| Updated Ranging Round Duration | 1/0 |
| Updated Slot Duration | 2/0 |

FIG. 6B

| Field | Bits |
|---|---|
| Number of Blocks | 4 |
| Block Index | 4 |
| Multi Node Mode | 0-1 |
| Ranging Round Usage | 2-3 |
| STS Packet Config | 4-5 |
| Schedule Mode | 6 |
| Deferred Mode | 7 |
| Time Structure Indicator | 8 |
| RCM Validity Rounds | 9-14 |
| MMRCR | 15 |
| Content Control | Octets: 1 |
| Ranging Block Duration | 0/3 |
| Ranging Round Duration | 0/1 |
| Ranging Slot Duration | 0/2 |
| Session ID | 0/4 |
| ..... | |
| Block Index | 4 |
| Multi Node Mode | 0-1 |
| Ranging Round Usage | 2-3 |
| STS Packet Config | 4-5 |
| Schedule Mode | 6 |
| Deferred Mode | 7 |
| Time Structure Indicator | 8 |
| RCM Validity Rounds | 9-14 |
| MMRCR | 15 |
| Content Control | Octets: 1 |
| Ranging Block Duration | 0/3 |
| Ranging Round Duration | 0/1 |
| Ranging Slot Duration | 0/2 |
| Session ID | 0/4 |

1001 — Number of Blocks row 1010-1 ← Instance containing information about block #1

1010-N ← Instance containing information about block #N

FIG. 10

| Field | Bits |
|---|---|
| 1101 — Number of Blocks | 4 |
| 1102 — Block Index | 4 |
| 1103 — Number of Bits per block | 10 |
| Relative Ranging Block Index | 1 |
| Updated Block Duration | 3 |
| Updated Ranging Round Duration | 1/0 |
| Updated Slot Duration | 2/0 |
| ..... | |
| Relative Ranging Block Index | 1 |
| Updated Block Duration | 3 |
| Updated Ranging Round Duration | 1/0 |
| Updated Slot Duration | 2/0 |

1110-1 ← Instance containing changed update information about block #1

1110-N ← Instance containing changed update information about block #N

FIG. 11

| Field | Bits |
|---|---|
| Number of Blocks | 1 |
| Block Index | 1 |
| Number of Sub-blocks | 1 |
| Sub-Block Index | 1 |
| Number of Rounds | 1 |
| Round Index | 1 |
| Number of Slots | 1 |
| . . . . . | |
| Number of Sub-blocks | 1 |
| Sub-Block Index | 1 |
| Number of Rounds | 1 |
| Round Index | 1 |
| Number of Slots | 1 |

1201 — Number of Blocks
1202 — Block Index 1210-1 ← Instance containing sub-block information about block #1

1210-N ← Instance containing sub-block information about block #N

FIG. 12

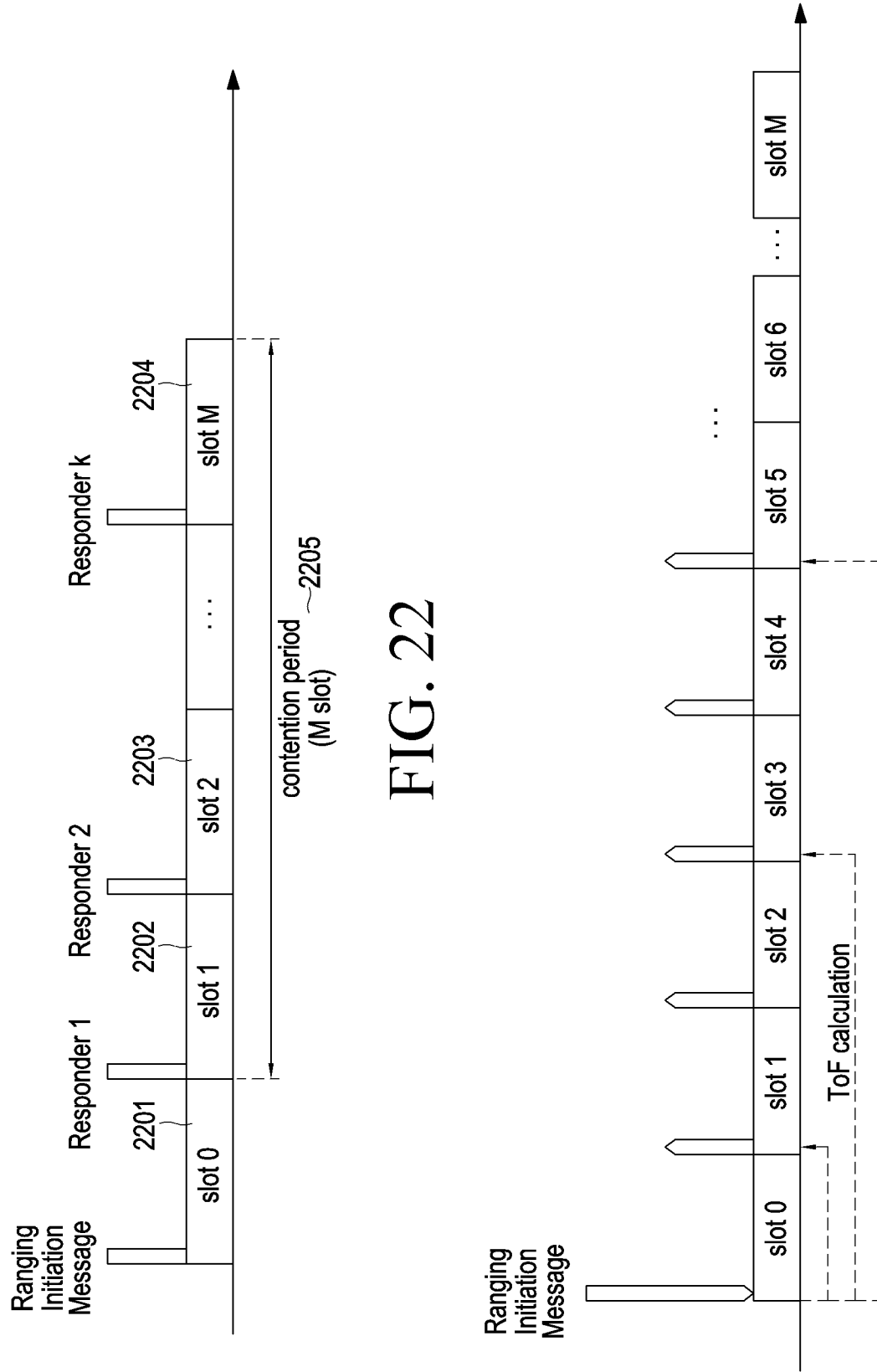

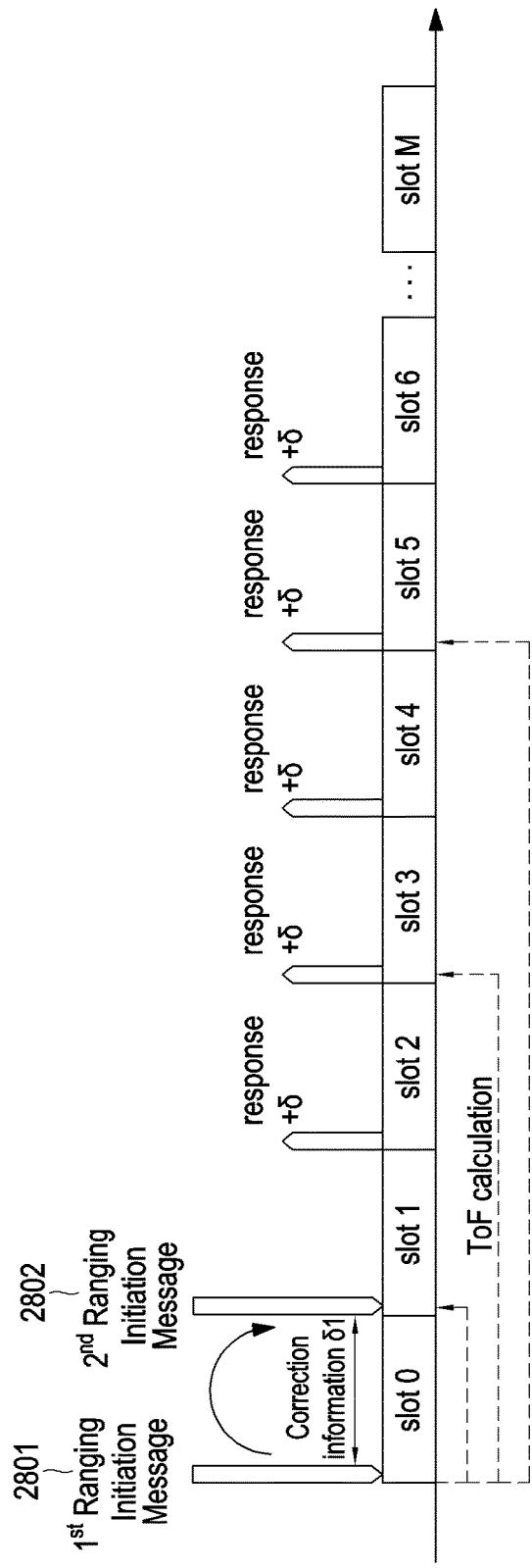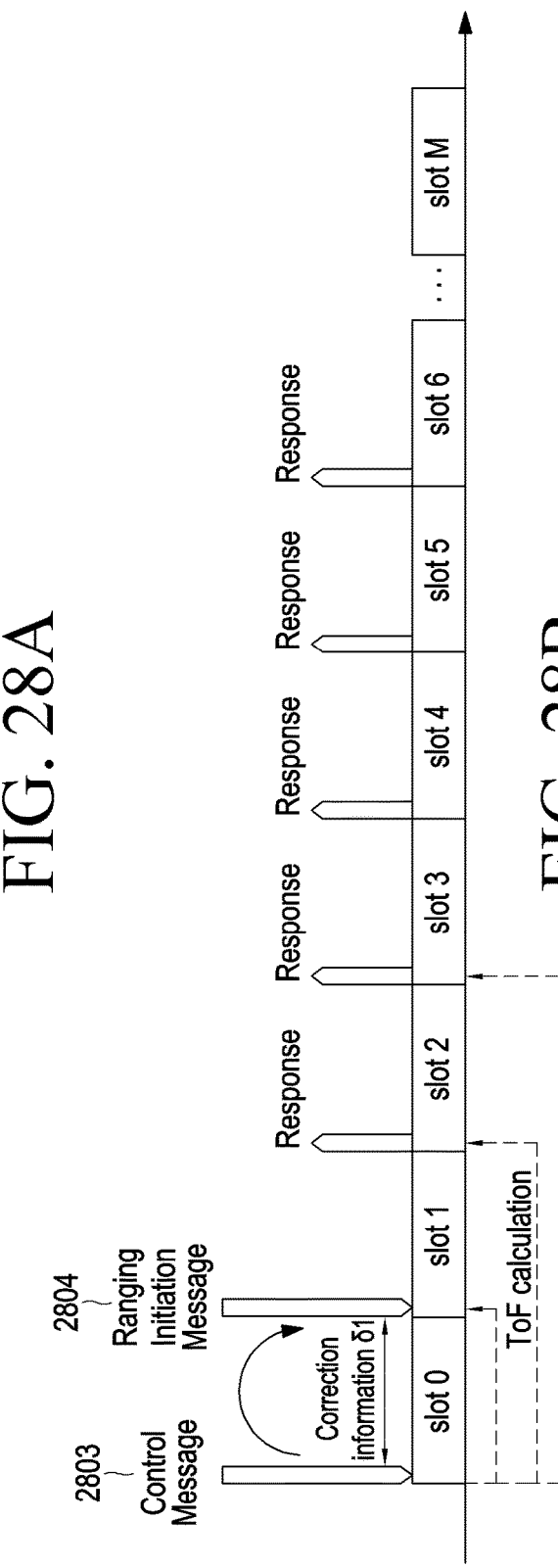

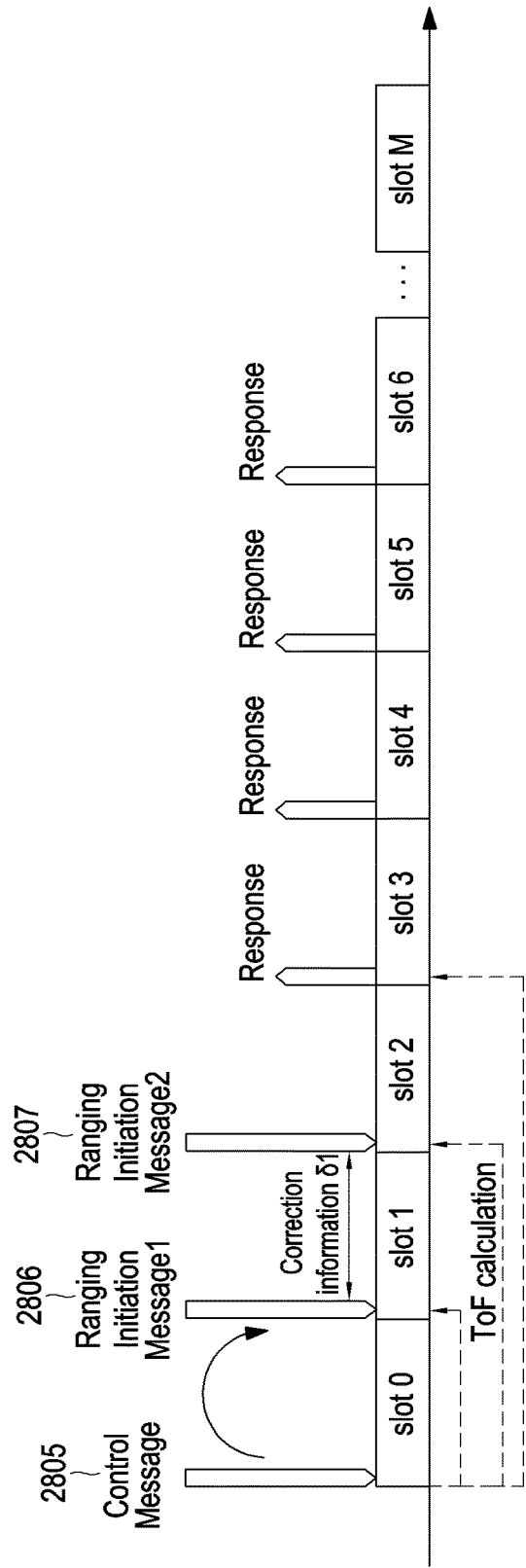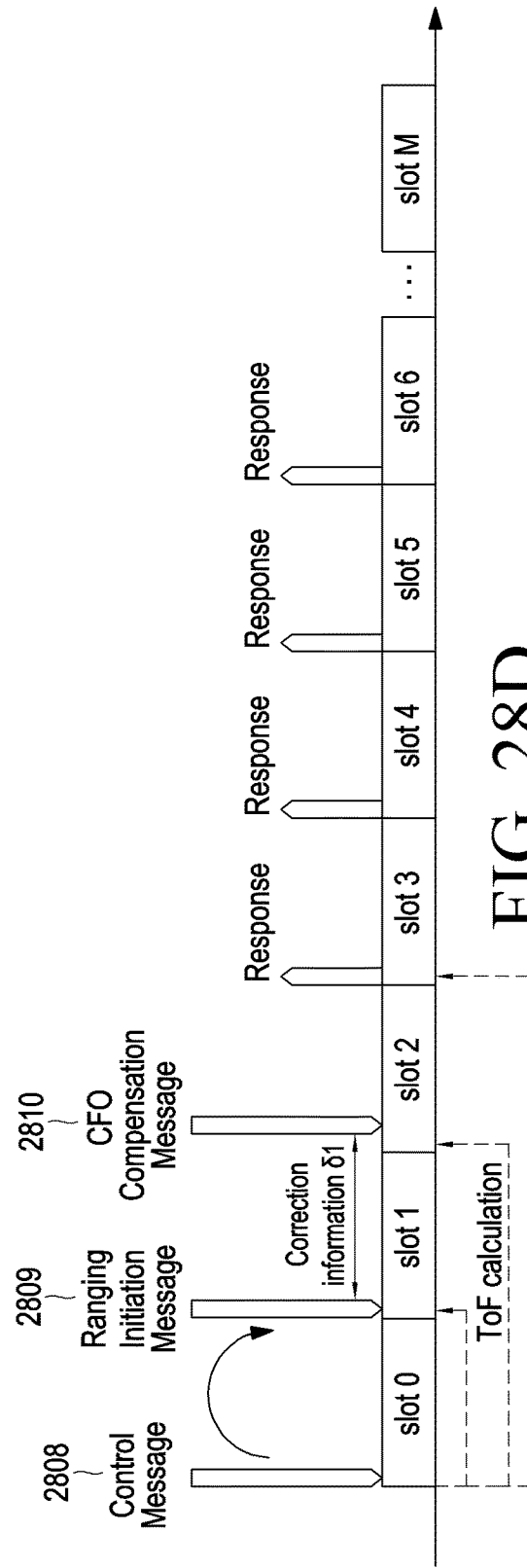
FIG. 28C
FIG. 28D

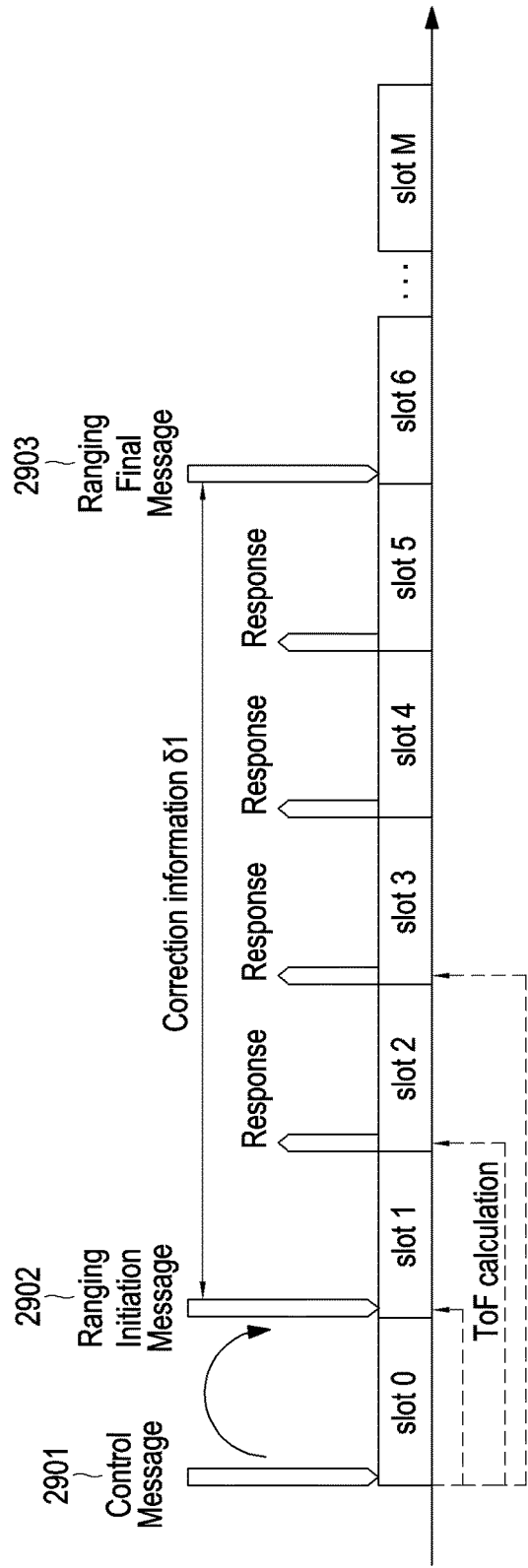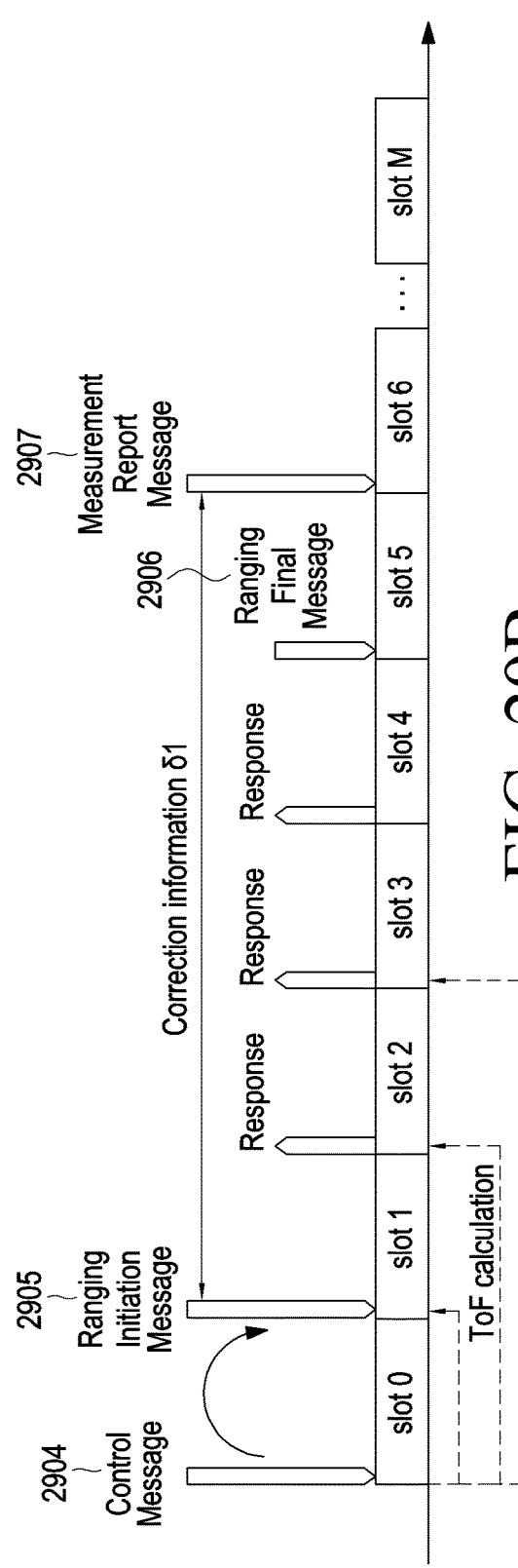

METHOD AND DEVICE FOR CONFIGURING TIME BLOCK STRUCTURE FOR UWB COMMUNICATION

CROSS-REFERENCE TO RELATED APPLICATION(S)

This application is based on and claims priority under 35 U.S.C. § 119(a) of a Korean patent application number 10-2022-0083385, filed on Jul. 6, 2022, in the Korean Intellectual Property Office, of a Korean patent application number 10-2022-0085113, filed on Jul. 11, 2022, in the Korean Intellectual Property Office, and of a Korean patent application number 10-2023-0003139, filed on Jan. 9, 2023, in the Korean Intellectual Property Office, the disclosure of each of which is incorporated by reference herein in its entirety.

BACKGROUND

1. Field

The disclosure relates to ultra-wide band (UWB) communication. More particularly, the disclosure relates to a method and device for configuring a time block structure for UWB communication.

2. Description of Related Art

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using ultra-wide band (UWB).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for configuring a time block structure.

Another aspect of the disclosure is to provide a flexible time block structure.

Additional aspects will be set forth in part in the description which follows and, in part, will be apparent from the description, or may be learned by practice of the presented embodiments.

In accordance with an aspect of the disclosure, a method performed by a controller in a communication system supporting ranging is provided. The method includes generating a ranging control message (RCM) including configuration information on a hyper block structure, and transmitting, to at least one controlee, the ranging control message, wherein the hyper block structure has a repeated pattern of a hyper block which is a group of ranging blocks.

In accordance with another aspect of the disclosure, a controller in a communication system supporting ranging is provided. The controller includes a transceiver, and a processor configured to generate a ranging control message (RCM) including configuration information on a hyper block structure, and transmit, to at least one controlee via the transceiver, the ranging control message, wherein the hyper block structure has a repeated pattern of a hyper block which is a group of ranging blocks.

In accordance with another aspect of the disclosure, a method performed by a controlee in a communication system supporting ranging is provided. The method includes receiving, from a controller, a ranging control message (RCM) including configuration information on a hyper block structure, and identifying the hyper block structure based on the configuration information, wherein the hyper block structure has a repeated pattern of a hyper block which is a group of ranging blocks.

In accordance with another aspect of the disclosure, a controlee in a communication system supporting ranging is provided. The controlee includes a transceiver, and a processor configured to receive, from a controller, a ranging control message (RCM) including configuration information on a hyper block structure, and identify the hyper block structure based on the configuration information, wherein the hyper block structure has a repeated pattern of a hyper block which is a group of ranging blocks.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a structure of a UWB medium access control (MAC) frame according to an embodiment of the disclosure;

FIG. 6A illustrates an advanced ranging control (ARC) information element (IE) including information for configuring a time block structure according to an embodiment of the disclosure;

FIG. 6B illustrates a ranging block update (RBU) IE including information for updating a time block structure according to an embodiment of the disclosure;

FIG. 10 illustrates an example of information for configuring a hyper-block structure according to an embodiment of the disclosure;

FIG. 11 illustrates an example of information for updating a hyper-block structure according to an embodiment of the disclosure;

FIG. 12 illustrates an example of information for configuring a sub block structure according to an embodiment of the disclosure;

FIG. 22 is a view illustrating an example ranging round structure performing SS-TWR according to an embodiment of the disclosure;

FIG. 23 is a diagram of SS-TWR message transmission/reception according to an embodiment of the disclosure;

FIGS. 28A, 28B, 28C, and 28D are diagrams of message transmission/reception in an enhanced SS-TWR scheme according to various embodiments of the disclosure;

FIGS. 29A, 29B, and 29C are diagrams of message transmission/reception in an enhanced SS-TWR scheme according to various embodiments of the disclosure;

Throughout the drawings, it should be noted that like reference numbers are used to depict the same or similar elements, features, and structures.

DETAILED DESCRIPTION

Figure 1:
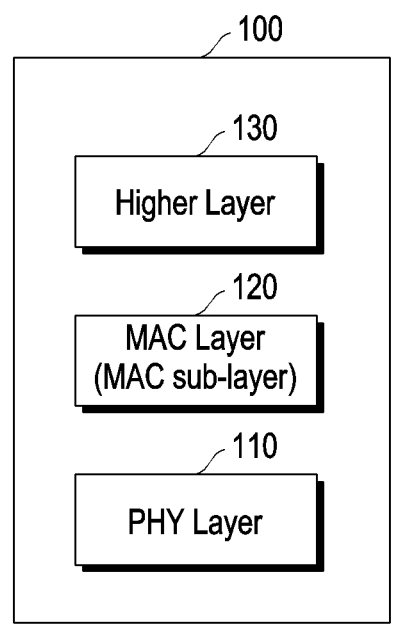
FIG. 1 illustrates an example architecture of a UWB device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more central processing units (CPUs) in a device or secure multimedia card. According to embodiments of the disclosure, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the disclosure unnecessarily unclear, the detailed description of known functions or configurations may be skipped in describing embodiments of the disclosure. The terms as used herein are defined considering the functions in the disclosure and may be replaced with other terms according to the intention or practice of the user or operator. Therefore, the terms should be defined based on the overall disclosure.

Hereinafter, embodiments of the disclosure are described in detail with reference to the accompanying drawings. Further, although a communication system using UWB is described in connection with embodiments of the disclosure, as an example, embodiments of the disclosure may also apply to other communication systems with similar technical background or features. For example, a communication system using Bluetooth or ZigBee may be included therein. Further, embodiments of the disclosure may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on institute of electrical and electronics engineers (IEEE) 802.11 which enables access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

According to the definitions by the Federal Communications Commission (FCC), UWB may refer to a wireless communication technology that uses a bandwidth of 500 MHz or more or a bandwidth corresponding to a center frequency of 20% or more. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known).

The terminology used herein is provided for a better understanding of the disclosure, and changes may be made thereto without departing from the technical spirit of the disclosure.

"Ranging device" may be a device capable of performing UWB ranging. In the disclosure, the ranging device may be a ranging device (RDEV) or enhanced ranging device (ERDEV) defined in, e.g., IEEE 802.15.4/4z. In the disclosure, the ranging device may be referred to as a UWB device.

"Advertiser" may be a device (e.g., ranging device) that transmits (or broadcasts) an advertisement message through an advertisement channel.

"Scanner" may be a device (e.g., ranging device) that scans an advertisement channel and receives an advertisement message. In the disclosure, the scanner may also be referred to as an observer.

"Controller" may be a device (e.g., ranging device) that defines and controls ranging control messages (RCM) (or control messages). The controller may define and control ranging features by transmitting a control message.

"Controlee" may be a device (e.g., ranging device) using a ranging parameter in the RCM (or control message) received from the controller. The controlee may use the same ranging features as those configured through control messages from the controller.

"Initiator" may be a device (e.g., ranging device) that initiates a ranging exchange. The initiator may initiate a ranging exchange by transmitting a first ranging frame (RFRAME) (ranging exchange message).

"Responder" may be a device (e.g., ranging device) that responds to the Initiator in a ranging exchange. The responder may respond to the ranging exchange message received from the initiator.

"In-band" may be data communication that uses UWB as an underlying wireless technology.

"Out-of-band (OOB)" may be data communication that does not use UWB as an underlying wireless technology.

"UWB Session" may be a period from when the controller and the controlee start communication through UWB until the communication stops. In the UWB session, a ranging frame RFRAME may be transferred, a data frame may be transferred, or both a ranging frame and a data frame may be transferred.

"UWB session identification (ID)" may be an ID (e.g., a 32-bit integer) that identifies the UWB session, shared between the controller and the controller.

"UWB session key" may be a key used to protect the UWB Session. The UWB session key may be used to generate a scrambled timestamp sequence (STS). In this disclosure, the UWB session key may be a UWB ranging session key (URSK), and may be abbreviated as a session key.

"UWB subsystem (UWBS)" may be a hardware component implementing the UWB PHY and MAC specifications included in the UWB device. In this disclosure, the UWB PHY and MAC specifications may be, e.g., the PHY and MAC specifications defined in, e.g., IEEE 802.15.4/4z. In this disclosure, the UWBS may be referred to as a UWB component.

"UWB-enabled application" may be an application for a service (UWB service). In this disclosure, "UWB-enabled Application" may be abbreviated as an application or a UWB application.

"Service" may be an implementation of a use case that provides a service to an end-user. In this disclosure, the service may be referred to as a UWB service.

"Service data" may be data defined by a service provider that needs to be transferred between two ranging devices to implement a service.

"Service provider" may be an entity that defines and provides hardware and software required to provide a specific service to an end-user.

"STS" may be a ciphered sequence for increasing the integrity and accuracy of ranging measurement timestamps.

Unlike "static STS," "dynamic STS mode" may be an operation mode in which the STS is not repeated during a ranging session. In this mode, the STS may be managed by the ranging device, and the ranging session key for generating STS may be managed by a secure component.

"Static STS mode" is an operation mode in which STS is repeated during a session, and does not need to be managed by the Secure Component.

"Secure channel" may be a data channel that prevents overhearing and tampering.

"Secure component" may be an entity (e.g., secure element (SE) or trusted execution environment (TEE)) having a defined security level that interfaces with UWBS for the purpose of providing RDS to UWBS, e.g., when dynamic STS is used.

"Secure ranging" may be ranging based on STS generated through a strong encryption operation.

When determined to make the subject matter of the disclosure unnecessarily unclear, the detailed description of related known functions or features may be skipped in describing the disclosure.

Hereinafter, various embodiments of the disclosure are described with reference to the accompanying drawings.

FIG. 1 illustrates an example architecture of a UWB device according to an embodiment of the disclosure.

Referring to FIG. 1, the UWB device 100 may include at least one PHY layer 110, a MAC layer (MAC sublayer) 120, and/or a higher layer 130. In the disclosure, the configuration including the PHY layer 110 and the MAC layer 120 may be referred to as UWBS.

(1) PHY Layer

At least one PHY layer 110 may include a transceiver with a low-level control mechanism. In this disclosure, the transceiver may be referred to as an RF transceiver or a radio transceiver.

In an embodiment, the PHY layer 110 may support at least one of the following functions.

Transceiver activation and deactivation function (transceiver on/off function)
Energy detection function
Channel selection function
Clear channel assessment (CCA) function
Synchronization function
Low-level signaling function
UWB ranging, positioning and localization functions
Spectrum resource management function
Function to transmit/receive packets through physical medium (2) MAC Layer The MAC layer 120 provides an interface between the upper layer 130 and the PHY layer 110.

In an embodiment, the MAC layer 120 may provide two services as follows.

MAC data service: A service that enables transmission and reception of MAC protocol data unit (PDU) through the PHY
MAC management service: Service interfacing to MAC sublayer management entity (MLME) service access point (SAP) (MLME-SAP)

In an embodiment, the MAC layer 120 may support at least one of the following functions.

Device discovery and connection setup function
Channel access function (access function for physical channel)
Synchronization function
Interference mitigation function based on energy detection
Functions related to narrowband signaling
Guaranteed timeslot (GTS) management function Frame delivery function
UWB ranging function
PHY parameter change notification function
Security function (3) Upper Layer The upper layer 130 may include a network layer providing functions, such as network configuration and message routing, and/or an application layer providing an intended function of the device.

In an embodiment, the application layer may be a UWB-enabled application layer for providing a UWB service.

FIG. 2 illustrates a structure of a UWB MAC frame according to an embodiment of the disclosure;

Referring to FIG. 2, the UWB MAC frame may be simply referred to as a MAC frame or frame. As an embodiment, the UWB MAC frame may be used to transfer UWB data (e.g., UWB message, ranging message, control information, service data, application data, transaction data, etc.).

Referring to FIG. 2, the UWB MAC frame may include a MAC header (MHR), a MAC payload and/or a MAC footer (MFR).

(1) MAC Header

The MAC header may include a Frame Control field, a Sequence Number field, a Destination Address field, a Source Address field, an Auxiliary Security Header field, and/or at least one Header IE field. According to an embodiment, some of the above-described fields may not be included in the MAC header, and additional field(s) may be further included in the MAC header.

In an embodiment, the Frame Control field may include a Frame type field, a Security Enabled field, a Frame Pending field, an AR field, a personal area network (PAN) ID Compression field, a Sequence Number Suppression field, an IE Present field, a Destination Addressing Mode field, a Frame Version field, and/or a Source Addressing Mode field. According to an embodiment, some of the above-described fields may not be included in the Frame Control field. Additional field(s) may be further included in the Frame Control field.

Each field is described below.

The Frame Type field may indicate the frame type. As an embodiment, the frame type may include a data type and/or a multipurpose type.

The Security Enabled field may indicate whether an Auxiliary Security Header field exists. The Auxiliary Security Header field may include information required for security processing.

The Frame Pending field may indicate whether the device transmitting the frame has more data for the recipient. In other words, the Frame Pending field may indicate whether there is a pending frame for the recipient.

The AR field may indicate whether acknowledgment for frame reception is required from the recipient.

The PAN ID Compression field may indicate whether the PAN ID field exists.

The Sequence Number Suppression field may indicate whether the Sequence Number field exists. The Sequence Number field may indicate the sequence identifier for the frame.

The IE Present field may indicate whether the Header IE field and the Payload IE field are included in the frame.

The Destination Addressing Mode field may indicate whether the Destination Address field may include a short address (e.g., 16 bits) or an extended address (e.g., 64 bits). The Destination Address field may indicate the address of the recipient of the frame.

The Frame Version field may indicate the frame version. For example, the Frame Version field may be set to a value indicating IEEE std 802.15.4z-2020.

The Source Addressing Mode field may indicate whether the Source Address field exists, and if the Source Address field exists, whether the Source Address field includes a short address (e.g., 16 bits) or an extended address (e.g., 64 bits). The Source Address field may indicate the address of the originator of the frame.

(2) MAC Payload

The MAC payload may include at least one Payload IE field. In an embodiment, the Payload IE field may include a Vendor Specific Nested IE. In an embodiment, the Payload IE field may include at least one IE for configuring or changing (updating) the time block structure.

(3) MAC Footer

The MAC footer may include an FCS field. The FCS field may include a 16-bit CRC or a 32-bit CRC.

Figure 3A:
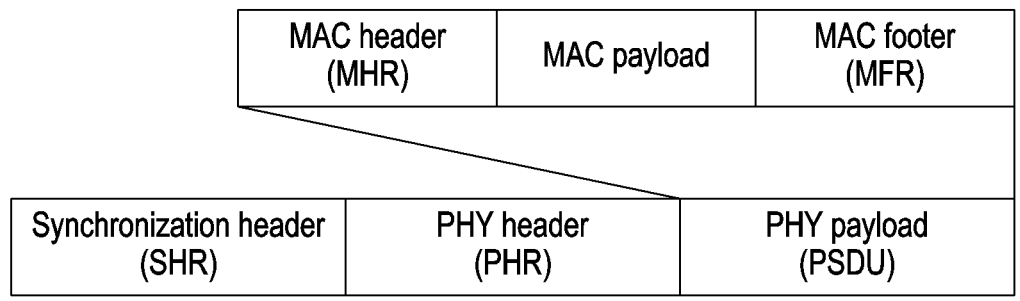
FIGS. 3A and 3B illustrate structures of a UWB physical layer (PHY) packet according to various embodiments of the disclosure.
Figure 3B:
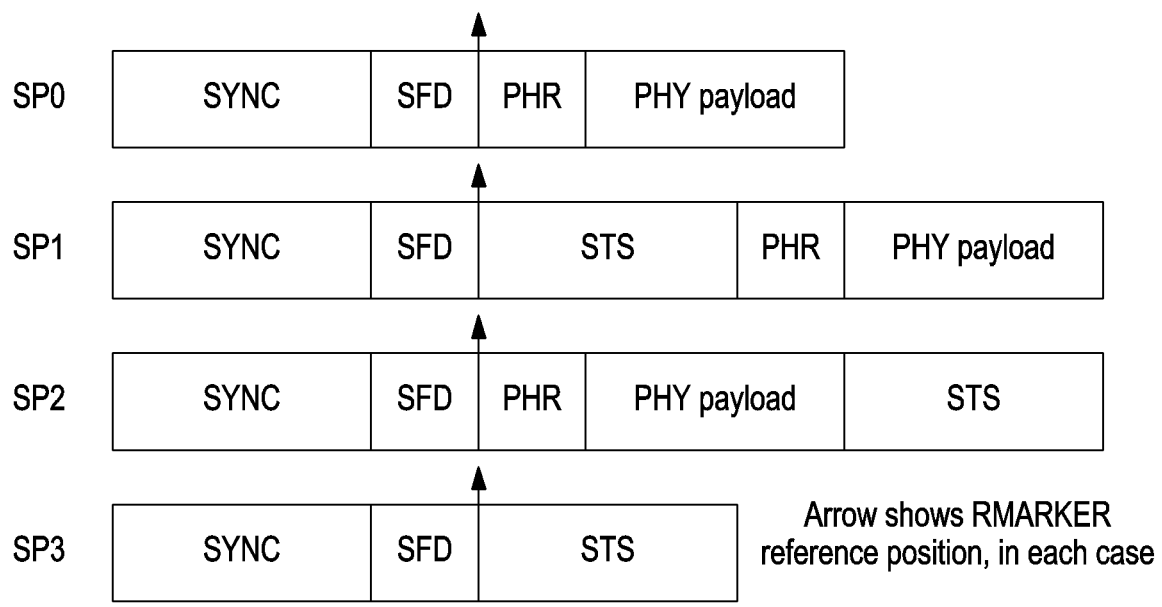

FIGS. 3A and 3B illustrate structures of a UWB PHY packet according to various embodiments of the disclosure.

FIG. 3A illustrates an example structure of a UWB PHY packet to which the STS packet configuration is not applied, and FIG. 3B illustrates an example structure of a UWB PHY packet to which the STS packet configuration is applied. In the disclosure, the UWB PHY packet may be referred to as a PHY packet, a PHY PDU (PPDU), or a frame.

Referring to FIG. 3A, the PPDU may include a synchronization header (SHR), a PHY header (PHR), and a PHY payload (PSDU). The PSDU may include a MAC frame. As shown in FIG. 2, the MAC frame may include a MAC header (MHR), a MAC payload and/or a MAC footer (MFR). In the disclosure, the synchronization header part may be referred to as a preamble, and the part including the PHY header and the PHY payload may be referred to as a data part.

The synchronization header may be used for synchronization for signal reception and may include a SYNC field and a start-of-frame delimiter (SFD).

The SYNC field may be a field including a plurality of preamble symbols used for synchronization between transmission/reception devices. The preamble symbol may be set through one of previously defined preamble codes.

The SFD field may be a field indicating the end of the SHR and the start of the data field.

The PHY header may provide information about the configuration of the PHY payload. For example, the PHY header may include information about the length of the PSDU, information indicating whether the current frame is an RFRAME (or Data Frame), and the like.

Meanwhile, the PHY layer of the UWB device may include an optional mode to provide a reduced on-air time for high density/low power operation. In this case, the UWB PHY packet may include an encrypted sequence (i.e., STS) to increase the integrity and accuracy of the ranging measurement timestamp. An STS may be included in the STS field of the UWB PHY packet and be used for secure ranging.

Referring to FIG. 3B, in the case of STS packet (SP) setting 0 (SP0), the STS field is not included in the PPDU (SP0 packet). In the case of SP setting 1 (SP1), the STS field is positioned immediately after the Start of Frame Delimiter (SFD) field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In other words, in the case of SP3, the PPDU does not include the PHR and PHY payload.

In the embodiment of FIG. 3B, each UWB PHY packet may include RMARKER for defining a reference time. RMARKER may be used to obtain the transmission time, reception time and/or time range of the ranging message (frame) in the UWB ranging procedure.

Figure 4A:
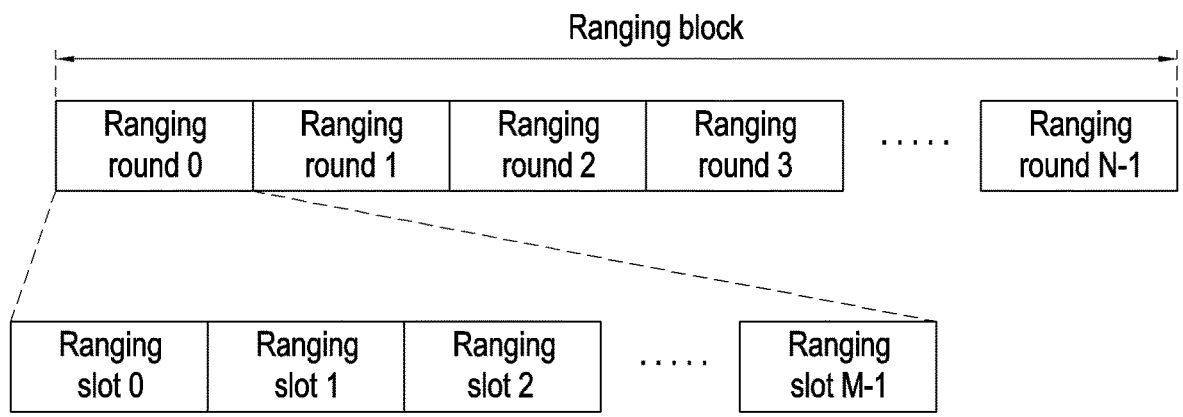
FIGS. 4A and 4B illustrate examples of a structure of a ranging block and round used for UWB ranging according to various embodiments of the disclosure.
Figure 4B:
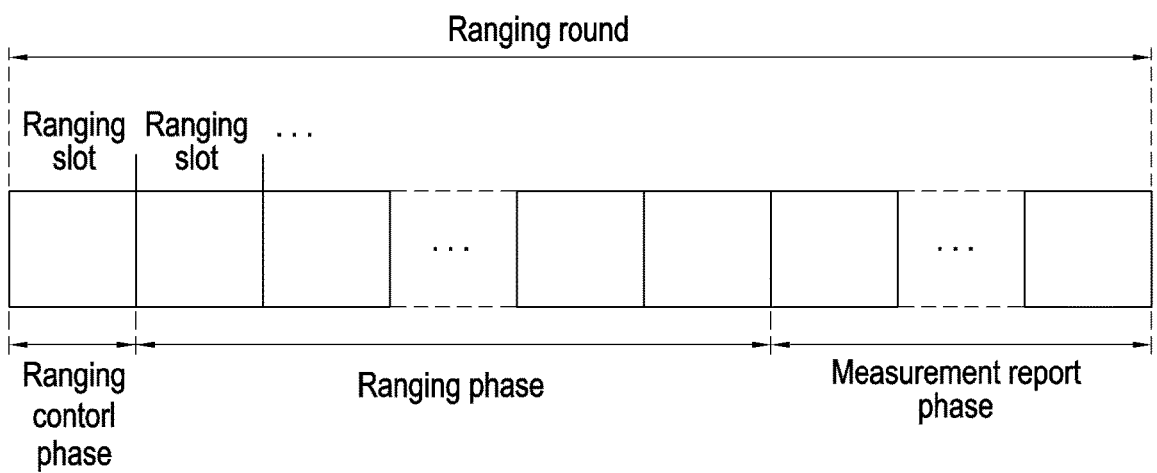

FIGS. 4A and 4B illustrate examples of a structure of a ranging block and round used for UWB ranging according to various embodiments of the disclosure.

In this disclosure, the ranging block refers to a time period for ranging. The ranging round may be a period of sufficient duration to complete one entire range-measurement cycle (ranging cycle) in which a set of ranging devices participating in a ranging exchange involves. The ranging slot may be a sufficient period for transmission of at least one ranging frame (RFRAME) (e.g., ranging initiation/reply/final message, etc.).

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

Referring to FIG. 4A, one ranging block may include at least one ranging round. Each ranging round may include at least one ranging slot. For example, as shown, one ranging block may include N ranging rounds, and ranging round #0 may include M ranging slots.

In the disclosure, the ranging block may be abbreviated as a block, the ranging round as a round, and the ranging slot as a slot.

Referring to FIG. 4B, one ranging round may include a ranging control phase, a ranging phase, and/or a measurement report phase. For example, as shown, one ranging round may include one slot for the ranging control phase, at least one slot for the ranging phase, and/or at least one slot for the measurement report phase. According to an embodiment, some of the above-described phases may not be included in the ranging round. Additional phases (e.g., ranging control update phase, or ranging interval update phase) may be further included in the ranging round.

The ranging control phase (RCP) may be a phase in which the controller transmits a ranging control message (RCM). The RCM may be a message transmitted by the controller to set ranging parameters. The RCM may be transmitted in the first slot (slot #0) of the ranging round.

The ranging phase may include a ranging initiation phase, a ranging response phase, and/or a ranging final phase.

The ranging initiation phase (RIP) may be a phase in which initiator(s) transmit ranging initiation message(s) to responder(s).

The ranging response phase (RRP) may be a phase in which the responder(s) transmit their response message(s) to the initiator.

The ranging final phase (RFP) may be a phase in which the initiator transmits final message(s) to responder(s). The ranging final phase may only be used for DS-TWR.

The measurement report phase (MRP) may be a phase in which participating ranging devices exchange service information related to ranging measurement.

The ranging control update phase (RCUP) may be a phase in which the controller transmits a ranging control update message (RCUM). The ranging control update phase may be included in the last slot of the set of ranging rounds designated by the RCM. The RCUM may be a message transmitted by the controller to update ranging parameters for the next ranging round(s). The RCUM may be transmitted in the last slot of the ranging round(s) designated by the RCM. The RCUM may include some or all of the information elements (IEs) employed by the RCM to update the values of parameters.

The ranging interval update phase (RIUP) may be a phase in which the controller transmits a ranging interval update message (RIUM). The RIUM may be a message transmitted by the controller to help synchronization between participating ranging devices or to update the interval between ranging blocks. The RIUM includes the scheduled time of the first RIUM. The RIUM may include the scheduled time of the next RIUM before the next ranging block starts.

In an embodiment, the controller may transmit an RCM including information (block configuration information) for configuring a time block structure, and the controller may configure the time block structure based on the block configuration information included in the RCM.

In an embodiment, the RCM may include the length (duration) of the ranging block, the length of the ranging round, and/or the length of the ranging slot. The RCM may include information about the device role of the ranging device.

In an embodiment, the controller may transmit the RCM on a per-round basis. For example, the controller may transmit the RCM in all or some of the ranging rounds in the ranging block. For example, the controller may transmit the RCM in ranging round #0 and ranging round #2 in the ranging block.

In an embodiment, the controller may transmit the RCM in the first slot (slot index 0) of the corresponding ranging round.

In an embodiment, the information (parameter) included in the RCM may be applied to the round(s) (e.g., one or more subsequent rounds) after the round (current round) in which the RCM is received.

Figure 5:
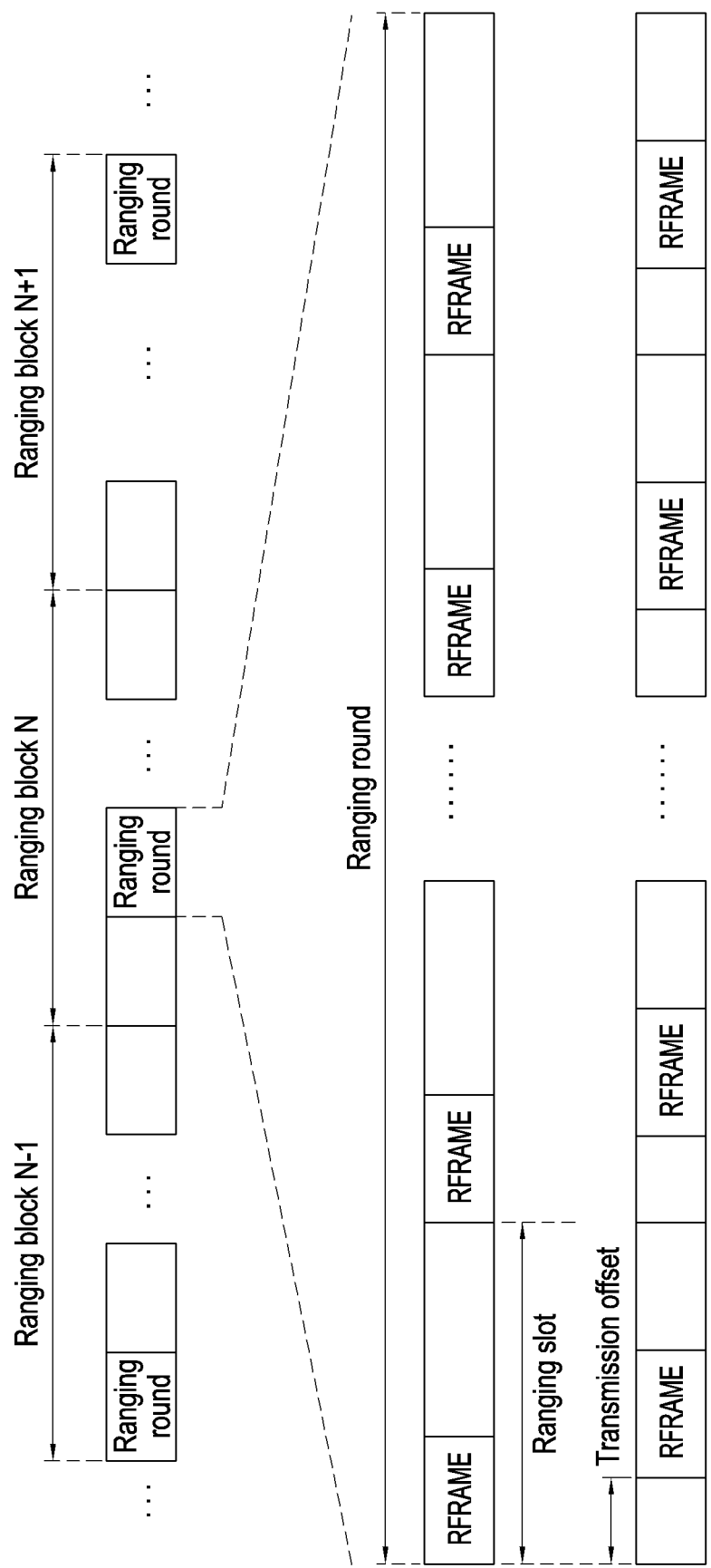
FIG. 5 illustrates a ranging block structure to which a block-based mode is applied according to an embodiment of the disclosure.

FIG. 5 illustrates a ranging block structure to which a block-based mode is applied according to an embodiment of the disclosure.

Referring to FIG. 5, the block-based mode uses a structured timeline in which the ranging block structure is basically periodical. In the block-based mode, a mean time between consecutive ranging rounds may be a constant. Also, in the block-based mode, the same block structure may be repeated.

In an embodiment, in the block-based mode, the ranging block structure may be configured by designating a ranging block length (duration) field, a ranging round length field, and a ranging slot length field in the advanced ranging control (ARC) IE.

In an embodiment, in the block-based mode, the number of ranging rounds may be obtained by dividing the ranging block length (duration) by the ranging round length, and the number of ranging slots may be obtained by dividing the ranging round length by the ranging slot length.

FIG. 6A illustrates an ARC IE including information for configuring a time block structure according to an embodiment of the disclosure.

In an embodiment, the ARC IE may be used by the controller to transmit ranging configuration information to a controlee (unicast case) or a plurality of controlees (broadcast case). In this case, the ARC IE may be included in the RCM and transmitted.

In an embodiment, the ARC IE may be used by the controlee to transmit preferred ranging parameters to the controller. In this case, the ARC IE may be transmitted together with a ringing change request (RCR) IE.

In an embodiment, the ARC IE may be transmitted through the payload IE field of the MAC frame.

In an embodiment, the ARC IE may be included in the RCM.

In an embodiment, the ARC IE may be used for initial setting of a time block structure (block/round/slot structure).

Referring to FIG. 6A, the ARC IE (or the content field of the ARC IE) may include a Multi Node Mode field, a Ranging Round Usage field, an STS Packet Config field, a Schedule Mode field, a Deferred Mode field, a Time Structure Indicator field, an RCM Validity Rounds field, a Multiple Message Receipt Confirmation Request (MRCR) field, a Content Control field, a Ranging Block Duration field, a Ranging Round Duration field, a Ranging Slot Duration field, and/or a Session ID field. According to an embodiment, some of the above-described fields may not be included in the ARC IE, or additional fields may be further included in the ARC IE.

The description of each field of ARC IE is as follows.

The Multi Node Mode field may specify whether the ranging is to be performed between a single pair of devices or is multi-node ranging involving many devices. The Multi Node Mode field may have one of values defined in Table 1 below.

TABLE 1

| Multi-node Mode field value | Meaning |
| --- | --- |
| 0 | Single device to single device (unicast) |
| 1 | Multi-node one-to-many |
| 2 | Multi-node many-to-many |
| 3 | Reserved |

The Ranging Round Usage may specify the use of the current ranging round and a subsequent number of ranging round(s) following the RCM as specified in the Ranging Validity Rounds field of the ARC IE. The Ranging Round Usage field may have one of the values defined in Table 2.

TABLE 2

| Ranging Round Usage field value | Selected ranging round use |
| --- | --- |
| 0 | One-way ranging (OWR) |
| 1 | Single-sided two-way ranging (SS-TWR) |
| 2 | Double-sided two-way ranging (DS-TWR) |
| 3 | Ranging ancillary information exchange |

The STS Packet Config field may specify the STS packet format to be used in the ranging round(s) that follow the ARC IE. The STS Packet Config field may have one of the values defined in Table 3.

TABLE 3

| STS Packet Config field value | Resultant STS packet configuration |
| --- | --- |
| 0 | No STS field included in the PPDU. |
| 1 | STS packet structure #1 (SP1) |
| 2 | STS packet structure #2 (SP2) |
| 3 | STS packet structure #3 (SP3) |

The Schedule Mode field may specify whether the scheduling-based ranging or contention-based ranging is performed. The Schedule Mode field may have one of the values defined in Table 4.

TABLE 4

| Schedule Mode field value | Selected ranging schedule mode and behavior |
| --- | --- |
| 0 | Contention-based ranging is used for the following ranging rounds, and the RDM IE and the RCPS IE are employed to control participation |
| 1 | Scheduled-based ranging is used for the following ranging rounds. Participation in the ranging and time slot allocation may be fixed, or controlled via the use of the RDM IE. |

The Deferred Mode field may specify whether or not the deferred frame is allowed for the measurement report. When the value of the Deferred Mode field is 1, the Deferred Mode field may indicate that the ranging slot is scheduled to exchange the Deferred data frame(s) after the ranging cycle. The Deferred data frame(s) may be used to report measurement information such as time-of-flight (ToF), reply time, and angle of attack (AoA). When the value of the Deferred Mode field is 0, the Deferred Mode field may indicate that the ranging slot is not scheduled for the data frame(s) for exchanging the requested information.

The Time Structure Indicator field may specify the ranging time structure behavior in the following ranging rounds. The Time Structure Indicator field may have one of the values defined in Table 5.

TABLE 5

| Time Structure Indicator field value | Selected ranging time structure behavior |
| --- | --- |
| 0 | The time structure is interval-based and the RIU IE is used to control the ranging interval updates. |
| 1 | The time structure is block-based and the RR IE and RBU IE are used to control the ranging interval updates. |

The RCM Validity Rounds field may specify the number of consecutive ranging rounds controlled by the RCM. The value of the RCM Validity Rounds field may not be greater than the number of remaining ranging blocks in the current ranging block.

The MMRCR field may specify whether multiple message receipt confirmation is requested or not. When the value of the MMRCR field is 1, multiple message reception confirmation is requested and, otherwise, multiple message reception confirmation is not requested.

The Content Control field may indicate presence or not of other fields in the ARC IE. The content control field may have a structure shown in Table 6 below.

TABLE 6

| Bits: 0 | 1 | 2 | 3 | 4-7 |
| --- | --- | --- | --- | --- |
| RBDP | RRDP | RSDP | SIP | Reserved |

The RBDP field may indicate the presence of the Ranging Block Duration field. In an embodiment, the RBDP field may have a value of 1 indicating the presence of the Ranging Block Duration field or a value of 0 indicating the absence of the Ranging Block Duration field.

The RRDP field may indicate the presence of the Ranging Round Duration field. In an embodiment, the RRDP field may have a value of 1 indicating the presence of the Ranging Round Duration field or a value of 0 indicating the absence of the Ranging Round Duration field.

The RSDP field may indicate the presence of the Ranging Slot Duration field. In an embodiment, the RSDP field may have a value of 1 indicating the presence of the Ranging Slot Duration field or a value of 0 indicating the absence of the Ranging Slot Duration field.

The SIP field may indicate the presence of the Session ID field. In an embodiment, the SIP field may have a value of 1 indicating the presence of the Session ID field or a value of 0 indicating the absence of the Session ID field.

The Ranging Block Duration field may specify the duration of a ranging block in the unit of RSTU.

The Ranging Round Duration field may specify the duration of the ranging round in units of ranging slots.

The Ranging Slot Duration field may specify the duration of a ranging slot in RSTU.

The Session ID field may specify the identifier of the ranging session. The Session ID field may include 4-octet session identifier that is unique to a session per controller. The ranging session may include one controller and at least one initiator.

In an embodiment, one or more Duration fields such as the Ranging Block Duration field, the Ranging Round Duration field, and the Ranging Slot Duration field may not be present in the ARC IE in the current RCM when the ranging block structure follows the same designated duration as before. Even in this case, other fields such as the Schedule Mode field and the STS Packet Config field may still be used to update corresponding ranging parameters.

FIG. 6B illustrates a ranging block update (RBU) IE including information for updating a time block structure according to an embodiment of the disclosure.

In an embodiment, the RBU IE may be transmitted to the controlee by the controller to signal an update of the ranging block structure. When the final message in the ranging message sequence is transmitted by the controller, the RBU IE may be included in the final message. However, when the final message in the ranging message sequence is transmitted by the controlee, the RBU IE may be transmitted by the controlee in the next RCM.

In an embodiment, the RBU IE may be transmitted through the payload IE field of the MAC frame.

In an embodiment, the RBU IE may be included in the RCM.

In an embodiment, the RBU IE may be used to update or change the time block structure (block/round/slot structure).

Referring to FIG. 6B, the RBU IE may include a Relative Ranging Block Index field, an Updated Block Duration field, an Updated Ranging Round Duration field, and/or an Updated Slot Duration field. According to an embodiment, some of the above-described fields may not be included in the RBU IE, or additional fields may be further included in the RBU IE.

The description of each field of RBU IE is as follows.

The Relative Ranging Block Index field may indicate the number of ranging blocks with the current ranging block structure before switching to the new ranging block structure.

The Updated Block Duration field may indicate a new ranging block duration on a per-RSTU basis. The RBU IE may signal the end of the ranging message exchange. In this case, the Updated Block Duration field in the RBU IE may be set to zero.

The Updated Ranging Round Duration field may specify the value of the ranging round duration in the new ranging block structure as an integer multiple of ranging slot duration.

The Updated Slot Duration field may specify the ranging slot duration value in a new ranging block structure on a per-RSTU basis.

In an embodiment, when the RBU IE is used to update only the ranging block duration, the Updated Ranging Round Duration field and the Updated Slot Duration field may not be present in the RBU IE.

Figure 7:
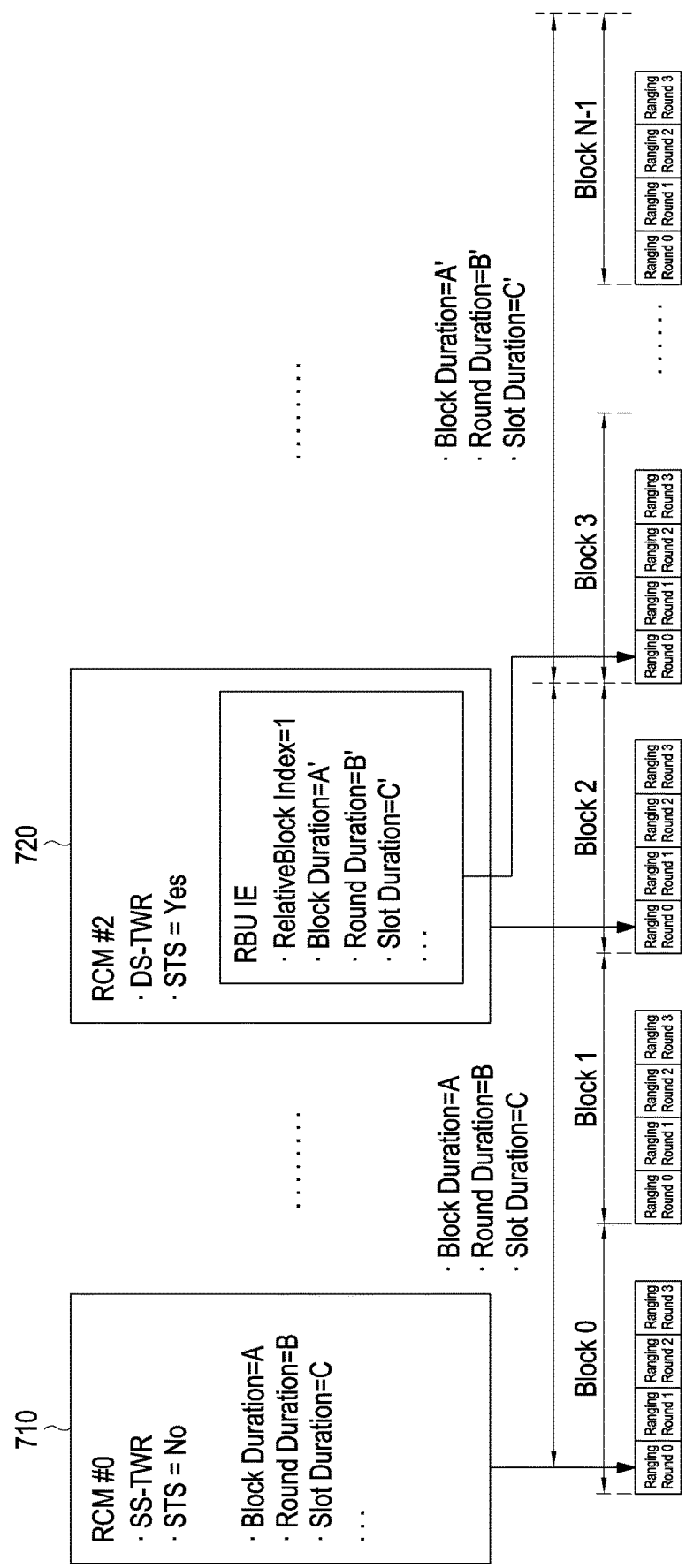
FIG. 7 illustrates a method for configuring and changing a time block structure according to an embodiment of the disclosure.

FIG. 7 illustrates a method for configuring and changing a time block structure according to an embodiment of the disclosure.

Referring to FIG. 7, a first RCM 710 for configuring a time block structure (a ranging block structure) in ranging block #0 may be transmitted by the controller.

The first RCM 710 or the ARC IE of the first RCM 710 may include a Ranging Round Usage field specifying SS-TWR and an STS Packet Config field specifying that there is no STS field.

Further, the first RCM 710 or the ARC IE of the first RCM 710 may include a Block Duration field set to A, a Round Duration field set to B, and a Slot Duration field set to C. The ranging block structure may be configured in the controlee by the Block Duration field, the Round Duration field, and the Slot Duration field. The so-configured block structure may be maintained in the ranging block(s) after ranging block #0 (current ranging block) where the first RCM 710 is received until information for change (e.g., RBU IE) is transmitted. For example, the block structure of [Block Duration=A, Round Duration=B, and Slot Duration=C] may be maintained in ranging block #1 before the RBU IE is transmitted.

Referring to FIG. 7, the second RCM 720 for changing the block structure configured in ranging block #2 may be transmitted by the controller.

The second RCM 720 or the ARC IE of the second RCM 720 may include a Ranging Round Usage field specifying DS-TWR and an STS Packet Config field specifying that there is an STS field (e.g., SP1).

Further, the second RCM 720 or the RBU IE of the second RCM 720 may include a Relative Ranging Block Index field set to 1, an Updated Block Duration field set to A', an Updated Ranging Round Duration field set to B', and/or an Updated Slot Duration field set to C'. The so-configured block structure may be applied from ranging block #3, which is the next ranging block of the ranging block (current ranging block) where the second RCM 720 is received, according to the Relative Ranging Block Index field set to 1. For example, the block structure of [Block Duration=A', Round Duration=B', and Slot Duration=C'] may be applied and maintained in ranging block #3.

Referring to FIG. 7, when a block structure is defined or initially configured through an ARC IE (or an RCM including an ARC IE) capable of specifying only one configuration, and when a change or update is required, the block structure is updated through an RBU IE (or the RCM including the RBU IE) capable of specifying only one configuration, the block structure specified by one setting value is fixed and maintained until the next change/update. The block structure configured in this way may be simple and less flexible.

Meanwhile, the ranging application features are currently being advanced, and accordingly, ranging technologies are being spread and applied to various services. Accordingly, rather than only one ranging mode being statically applied to one block structure, several ranging/transmission modes need to be dynamically/complexly applied to one block structure. For example, along with, or separately from, periodic ranging/data transmission, on-demand/bulk data transmission may be applied to one block structure. In this case, the number of slots required per block or round may be different. This may generate a plurality of unused slots in a specific ranging block among ranging blocks set to have the same duration. This may cause inefficiency in slot use.

Further, with the advancement of UWB communication technology, additional functions such as device discovery, high-capacity data transmission, sensing, and the like, as well as ranging, may be provided through UWB communication. In this case, the number of slots required to operate each additional function may also vary per block/round, and if the lengths of all blocks are uniformly fixed to the same value, very inefficient use of slots will inevitably result.

Therefore, there is a need for a flexible block structure capable of supporting various services/modes such as ranging, sensing, and high-capacity data transmission, rather than a static block structure. Such a block structure needs to have a repetition pattern of a group of blocks or sub-blocks having various durations, rather than repetition of a block having a constant duration.

Hereinafter, various embodiments for more flexibly configuring a time block structure are described. The block/round/slot used in the following embodiments may be used not only for ranging but also for various purposes such as sensing, data transmission, and large-capacity data transmission.

Embodiment 1: Hyper-Block Structure

Embodiment 1 corresponds to an embodiment of configuring a hyper-block structure for configuring a hyper-block, which is a set of consecutive blocks.

In the hyper-block structure, the hyper-block may include a plurality of blocks, each block may include at least one round, and each round may include at least one slot.

In the hyper-block structure, the duration between blocks, the duration between rounds, and/or the duration between slots may be set to differ from each other. In other words, in the hyper-block structure, the configuration and internal configuration (round/slot) of each block may be set flexibly and dynamically. Accordingly, a completely flexible and dynamic block structure may be set.

However, in the hyper-block structure, the block structure may not be configured/changed using an IE such as the ARC IE/RBU IE of FIGS. 6A and 6B, and an IE including parameters for configuring the hyper-block structure may be newly defined. As an optional embodiment, a system using the ARC IE/RBU IE may be compatible with the legacy system by defining separate IEs.

In the disclosure, the hyper-block structure may be referred to as a first time block structure, a first type time block structure, or the like.

Embodiment 2: Sub-Block Structure

Embodiment 2 corresponds to an embodiment in which one block is divided into multiple sub-blocks.

In the sub-block structure, durations between sub-blocks in a block may be set to be different from each other, but durations between blocks are set to be the same. In the sub-block structure, the duration of the block may be set/changed using an IE such as the ARC IE/RBU IE of FIGS. 6A and 6B. However, a new IE for configuring each sub-block needs to be defined. In other words, in the sub-block structure, as compared to the hyper-block structure, it is not necessary to define a completely new IE for configuring the block structure, and the ARC IE/RBU IE of FIGS. 6A and 6B may be utilized. Therefore, it is possible to be compatible with the system using the ARC IE/RBU IE of FIGS. 6A and 6B.

However, in the sub-block structure, because the durations of consecutive blocks are the same, it is difficult to completely flexibly and dynamically configure the internal configuration (sub-block/round/slot structure) of the block as in the embodiment of the hyper-block structure. In other words, the degree of freedom is limited.

In the disclosure, the sub-block structure may be referred to as a second time block structure, a second type time block structure, or the like.

Meanwhile, according to an embodiment, a time block structure in which a hyper-block structure and a sub block structure are merged may be used.

Figure 8A:
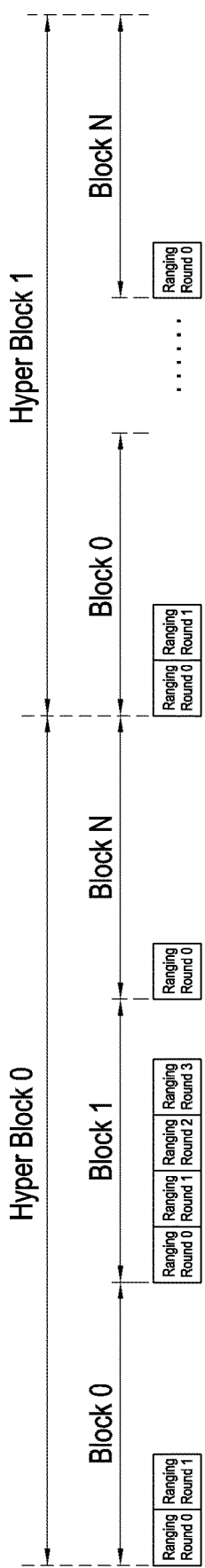
FIGS. 8A and 8B illustrate an example of a hyper-block structure according to various embodiments of the disclosure.
Figure 8B:
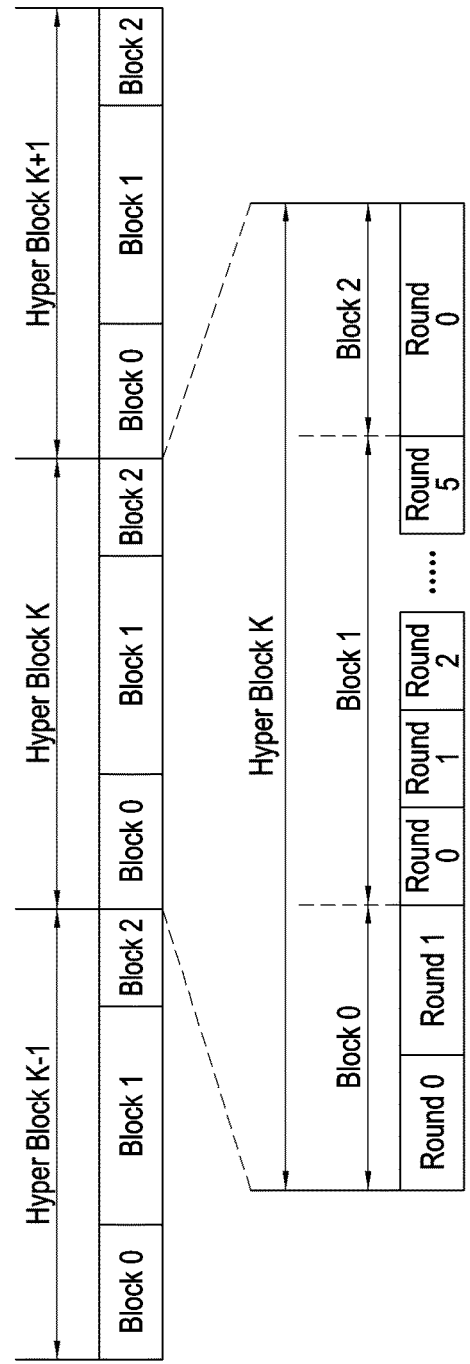

FIGS. 8A and 8B illustrate an example of a hyper-block structure according to various embodiments of the disclosure.

Referring to FIG. 8A, there may be continuous hyper-blocks having a hyper-block structure. For example, as shown in FIG. 8A, hyper-block #0 and hyper-block #1 may be continuously arranged.

Each hyper-block may include at least one block. For example, as shown in FIG. 8A, hyper-block #0 may include block #0, block #1, . . . block #N. hyper-block #1 may include block #0, . . . block #N. In an embodiment, durations between blocks in or between hyper-blocks may be the same as or different from each other. In other words, the duration of each block may be freely set according to the configuration. For example, the durations of block #0 and block #1 of hyper-block #0 may be set to be identical to or different from each other, and the durations of block #0 of hyper-block #0 and block #0 of hyper-block #1 may be set to be identical to or different from each other.

Each block may include at least one round. Referring to FIG. 8A, in hyper-block #0, block #0 may include round #0 and round #1, block #1 may include round #0, round #1, round #2, and round #3, and block #N may include round #0. The durations between rounds in or between blocks may be the same or different from each other. In other words, the duration of each round may be freely set according to the configuration. For example, round #0 and round #1 of block #0 may be set to be identical to or different from each other, and round #0 of block #0 and round #0 of block #1 may be set to be identical to or different from each other.

Each round may include at least one slot. For example, round #0 of block #0 may include at least one slot. The durations between slots in or between rounds may be the same or different from each other. In other words, the duration of each slot may be freely set according to the configuration.

There may be continuous hyper-blocks having the hyper-block structure of FIG. 8B. Referring to FIG. 8B, a plurality of hyper-blocks, such as hyper-block K−1, hyper-block K, hyper-block K+1, . . . , may be continuously arranged.

Each hyper-block may include a plurality of blocks. Although FIG. 8B illustrates an example in which each hyper-block includes three blocks for convenience of description, each hyper-block may include two or more blocks. In the example of FIG. 8B, hyper-block K may include block #0, block #1, and block #2, and the durations between blocks in hyper-block K may be identical to or different from each other as in the example of FIG. 8A. In other words, the duration of each block may be freely set according to the configuration For example, the durations between block #0, block #1, and block #2 of hyper-block K may be set to be identical to or different from each other. The durations between rounds in block #0, block #1, and block #2 may be set to be identical to or different from each other. In the example of FIG. 8B, each of block #0, block #1, and block #2 may include at least one round. In other words, the durations between rounds in each block or between blocks may be freely set according to the configuration. For example, round #0 and round #1 of block #0 may be set to be identical to or different from each other, and round #0 of block #0 and round #0 of block #1 may be set to be identical to or different from each other. Further, each of block #0, block #1, and block #2 may be filled with rounds, and a plurality of hyper-blocks may have the same or different structures.

As described above, in the hyper-block structure, durations between hyper-blocks, blocks, rounds, and slots may be freely set according to the configuration. In other words, it may have a high degree of freedom.

In an embodiment, the hyper-block structure may be configured through a newly defined IE (e.g., HyperBlockDescriptorIE) for configuring the hyper-block structure.

HyperBlockDescriptorIE may be an information structure including structure information about all the hyper-blocks. In the disclosure, the HyperBlockDescriptorIE may be referred to as a hyper-block IE, a hyper-block List IE, or a HyperBlockDescriptorList IE.

In an embodiment, the HyperBlockDescriptorIE may include a HyperBlockDuration field, a NumberofBlocks field, a BlockDuration [i] field, a BlockUsage [i] field, a NumberofRounds [i] field, a RoundDuration [i, j] field, a RoundUsage [i,j] field, and/or an IEComplete field. According to an embodiment, some of the above-described fields may not be included in HyperBlockDescriptorIE, or an additional field may be further included in HyperBlockDescriptorIE.

Each field in HyperBlockDescriptorIE may be described as follows.

The HyperBlockDuration field may specify the entire duration of one hyper-block.

The NumberofBlocks field may specify the number of all the blocks in one hyper-block.

The BlockDuration [i] field may specify the length of the $i^{th}$ block in the hyper-block.

The BlockUsage [i] field may specify the usage mode of the $i^{th}$ block in the hyper-block. In an embodiment, the BlockUsage [i] field may have one of the values defined in Table 7 below. Through the BlockUsage [i] field, a usage mode for each block may be separately set in one hyper-block. For example, a first block in the hyper-block may be used for sensing, a second block in the hyper-block may be used for high rata data transmission, and a third block in the hyper-block may be used for an event driven method/service.

TABLE 7

| BlockUsage [i] field value | Selected block use |
| --- | --- |
| 0 | One-way ranging (OWR) |
| 1 | Single-sided two-way ranging (SS-TWR) |
| 2 | Double-sided two-way ranging (DS-TWR) |
| 3 | Sensing |
| 4 | High Rate Data |
| 5 | Event Driven |

TABLE 7-continued

| BlockUsage [i] field value | Selected block use |
| --- | --- |
| 6 | DownLink-Time Difference of Arrival (DL-TDoA) |
| 7- | Reserved |

The NumberofRounds [i] field may specify the number of rounds in the ith block in the hyper-block.

The RoundDuration [i, j] field may specify the length of the jth round of the ith block in the hyper-block.

The RoundUsage [i,j] field may specify the usage mode of the jth round of the ith block in the hyper-block. In an embodiment, the RoundUsage [i,j] field may have one of the values defined in Table 8 below. The usage mode for each round may be separately set in one block through the RoundUsage [i,j] field. For example, the first round in the block may be used for sensing, the second round in the block may be used for high rata data transmission, and the third round in the block may be used for an event driven method/service.

TABLE 8

| RoundUsage [i, j] field value | Selected round use |
| --- | --- |
| 0 | One-way ranging (OWR) |
| 1 | Single-sided two-way ranging (SS-TWR) |
| 2 | Double-sided two-way ranging (DS-TWR) |
| 3 | Sensing |
| 4 | High Rate Data |
| 5 | Event Driven |
| 6 | DownLink-Time Difference of Arrival (DL-TDoA) |
| 7- | |

The IEComplete field may specify whether the entire current hyper structure information is currently described in one IE.

In an embodiment, the controller may transmit HyperBlockDescriptorIE to one or more controlees to configure the hyper-block structure.

In an embodiment, the HyperBlockDescriptorIE may be included in the payload IE field of the MAC Frame and transmitted.

In an embodiment, HyperBlockDescriptorIE may be included in the RCM and transmitted, or may be included in another control message or another UWB message and transmitted.

In an embodiment, the HyperBlockDescriptorIE may be configured for each hyper-block, or one HyperBlockDescriptorIE may be configured for a plurality of hyper-blocks.

Figure 9:
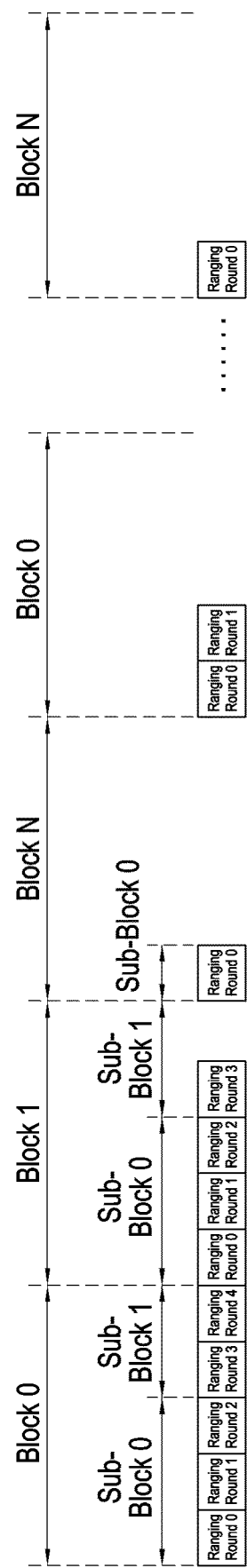
FIG. 9 illustrates an example of a sub block structure according to an embodiment of the disclosure.

FIG. 9 illustrates an example of a sub block structure according to an embodiment of the disclosure.

Referring to FIG. 9, there may be at least one block having a sub-block structure. For example, as shown in FIG. 9, block #0, block #1 . . . block #N having a sub-block structure may be continuously arranged. In an embodiment, the durations between blocks in the sub-block structure are equal to each other. For example, the durations of blocks #0 to #N may be the same.

Each block may include at least one sub-block. For example, as shown in FIG. 9, block #0 may include sub-block #0 and sub-block #1, block #1 may include sub-block #0 and sub-block #1, and block #3 may include sub-block #0. In an embodiment, durations between sub-blocks in or between blocks may be the same as or different from each other. In other words, the duration of each sub-block may be freely set according to the configuration. For example, the durations of sub-block #0 and sub-block #1 of the block #0 may be set to be different from each other, and the durations of sub-block #0 of the block #0 and sub-block #0 of the block #1 may be set to be different from each other.

Each block may include at least one round. For example, as shown in FIG. 9, in block #0, sub-block #0 may include round #0, round #1, and round #2, and sub-block #1 may include round #0 and round #1. The durations between rounds in or between sub-blocks may be the same or different from each other. In other words, the duration of each round may be freely set according to the configuration. For example, round #0 and round #1 of sub-block #0 may be set to be different from each other, and round #0 of sub-block #0 and round #0 of sub-block #1 may be set to be different from each other.

Each round may include at least one slot. For example, round #0 of sub-block #0 may include at least one slot. The durations between slots in or between rounds may be the same or different from each other. In other words, the duration of each slot may be freely set according to the configuration.

As such, in the sub-block structure, the duration between the blocks is set to be the same for utilizing the ARC IE, but the sub-blocks constituting the block may be set to be different from each other as necessary.

In an embodiment, the sub-block structure may be configured through a newly defined IE (e.g., SubBlockDescriptorIE) for the sub-block structure.

SubBlockDescriptorIE may be an information structure including structure information about all the sub-blocks. In the disclosure, the SubBlockDescriptorIE may be referred to as a sub-block IE and a sub-block List IE.

In an embodiment, the SubBlockDescriptorIE may include a BlockDuration field, a NumberofSubBlocks field, a SubBlockDuration [i] field, a SubBlockUsage [i] field, a NumberofRounds [i] field, a RoundDuration [i, j] field, a RoundUsage [i, j] field, and/or an IEComplete field. According to an embodiment, some of the above-described fields may not be included in the SubBlockDescriptorIE, or an additional field may be further included in the SubBlockDescriptorIE.

Each field in SubBlockDescriptorIE may be described as follows.

The BlockDuration field may specify the length of one block.

The NumberofSubBlocks field may specify the number of all the sub-blocks in one block.

The SubBlockDuration [i] field may specify the length of the ith sub-block in the block.

The SubBlockUsage [i] field may specify the usage mode of the ith sub-block in the block. In an embodiment, the SubBlockUsage [i] field may have one of the values defined in Table 9 below. Through the SubBlockUsage [i] field, a usage mode for each sub-block may be separately set in one block. For example, a first sub-block in the block may be used for sensing, a second sub-block in the block may be used for high rata data transmission, and a third sub-block in the block may be used for an event driven method/service.

TABLE 9

| SubBlockUsage [i] field value | Selected Subblock use |
| --- | --- |
| 0 | One-way ranging (OWR) |
| 1 | Single-sided two-way ranging (SS-TWR) |

TABLE 9-continued

| SubBlockUsage [i] field value | Selected Subblock use |
| --- | --- |
| 2 | Double-sided two-way ranging (DS-TWR) |
| 3 | Sensing |
| 4 | High Rate Data |
| 5 | Event Driven |
| 6 | DownLink-Time Difference of Arrival (DL-TDoA) |
| 7- | Reserved |

The NumberofRounds [i] field may specify the number of rounds in the ith sub-block in the block.

The RoundDuration [i, j] field may specify the length of the jth round of the ith sub-block in the block.

The RoundUsage [i, j] field may specify the usage mode of the jth round of the ith sub-block in the block. In an embodiment, the SubBlockUsage [i] field may have one of the values defined in Table 8 below. Through the RoundUsage [i, j] field, a usage mode for each round may be separately set in one sub-block. For example, the first round in the sub-block may be used for sensing, the second round in the sub-block may be used for high rata data transmission, and the third round in the sub-block may be used for an event driven method/service.

TABLE 10

| RoundUsage [i, j] field value | Selected round use |
| --- | --- |
| 0 | One-way ranging (OWR) |
| 1 | Single-sided two-way ranging (SS-TWR) |
| 2 | Double-sided two-way ranging (DS-TWR) |
| 3 | Sensing |
| 4 | High Rate Data |
| 5 | Event Driven |
| 6 | DownLink-Time Difference of Arrival (DL-TDoA) |
| 7- | Reserved |

The IEComplete field may specify whether the entire current sub-block structure information is described in one current IE.

In an embodiment, the controller may transmit the SubBlockDescriptorIE to one or more controlees to configure the sub-block structure.

In an embodiment, the SubBlockDescriptorIE may be included in the payload IE field of the MAC Frame and transmitted.

In an embodiment, SubBlockDescriptorIE may be included in the RCM and transmitted, or may be included in another control message or another UWB message and transmitted.

In an embodiment, the SubBlockDescriptorIE may be transmitted together with, or separately from, the ARC IE or the RBU IE.

In an embodiment, the SubBlockDescriptorIE may be configured for each block, or one SubBlockDescriptorIE may be configured for a plurality of blocks.

FIG. 10 illustrates an example of information for configuring a hyper-block structure according to an embodiment of the disclosure.

The information (hyper-block structure configuration information) for configuring the hyper-block structure according to the embodiment of FIG. 10 may be an example of the HyperBlockDescriptorIE described above with reference to FIGS. 8A and 8B.

The hyper-block structure information may include all or some of fields included in the HyperBlockDescriptorIE. For example, the hyper-block structure information may include a HyperBlockDuration field, a NumberofBlocks field, a BlockDuration [i] field, a BlockUsage [i] field, a NumberofRounds [i] field, a RoundDuration [i, j] field, a RoundUsage [i,j] field, and/or an IEComplete field. For a description of each field, refer to the description described above with reference to FIGS. 8A and 8B.

In an embodiment, the hyper-block structure configuration information may include a number of blocks field (NumberofBlocks field) for specifying the number of blocks and an instance for at least one block. Referring to FIG. 10, the hyper-block structure configuration information may include a number of blocks field 1001 for specifying the number of blocks in the hyper-block, a first instance 1010-1 including information about a first block (block #1), . . . , an Nth instance 1010-N including information about the Nth block. The number of instances included in the hyper-block structure configuration information may correspond to a value indicated by the number of blocks field.

Each instance may include a block index field for specifying the index of the corresponding block and configuration information about the corresponding block. For example, the first instance 1010-1 may include a block index field for specifying the index of the first block and configuration information about the first block, and the Nth instance 1010-N may include a block index field for specifying the index of the Nth block and configuration information about the Nth block.

In an embodiment, the configuration information about the block may include all or some of fields included in the ARC IE of FIG. 6A. For example, the configuration information about the block may include a Multi Node Mode field, a Ranging Round Usage field, an STS Packet Config field, a Schedule Mode field, a Deferred Mode field, a Time Structure Indicator field, an RCM Validity Rounds field, a Multiple Message Receipt Confirmation Request (MRCR) field, a Content Control field, a Ranging Block Duration field, a Ranging Round Duration field, a Ranging Slot Duration field, and/or a Session ID field. For a description of each field, refer to the description of FIG. 6A.

Meanwhile, the UWB device (controlee) receiving the HyperBlockDescriptorIE may identify the hyper-block structure through the HyperBlockDescriptorIE and configure the hyper-block structure. The so-configured hyper-block structure may be the same as that illustrated in FIGS. 8A and 8B.

FIG. 11 illustrates an example of information for updating a hyper-block structure according to an embodiment of the disclosure.

The information (hyper-block structure update information) for updating the hyper-block structure according to the embodiment of FIG. 11 may be referred to as HyperBlockUpdateDescriptorList IE. The hyper-block structure update information may be set to have different block structures (block/round/slot structures) and operating forms between consecutive adjacent blocks.

The hyper-block structure update information may include a number of blocks field, a block index field, a number of bits per block field, and/or an instance for at least one block. For example, referring to FIG. 11, the hyper-block structure update information may include a number of blocks field 1101 for specifying the number of blocks in the hyper-block, a block index field 1102, a number of bits per block field 1103, a first instance 1110-1 including update information about a first block (block #1), . . . , an Nth instance 1110-N including update information about the Nth block. The number of instances included in the hyper-block structure update information may correspond to a value indicated by the number of blocks field.

Each instance may include update information about a corresponding block. For example, the first instance 1110-1 may include update information about the first block, and the Nth instance 1110-N may include update information about the Nth block. In an embodiment, each instance may include a block index field that specifies the index of the corresponding block.

In an embodiment, the update information about the block may include all or some of fields included in the RBU IE of FIG. 6B. For example, the update information about the block may include a Relative Ranging Block Index field, an Updated Block Duration field, an Updated Ranging Round Duration field, and/or an Updated Slot Duration field. For a description of each field, refer to the description of FIG. 6B.

FIG. 12 illustrates an example of information for configuring a sub block structure according to an embodiment of the disclosure.

The information (sub-block structure configuration information) for configuring the sub-block structure according to the embodiment of FIG. 12 may be an example of the SubBlockDescriptorIE described above with reference to FIG. 9.

The sub-block structure configuration information may include all or some of fields included in the SubBlockDescriptorIE. For example, the sub-block structure configuration information may include a BlockDuration field, a NumberofSubBlocks field, a SubBlockDuration [i] field, a SubBlockUsage [i] field, a NumberofRounds [i] field, a RoundDuration [i, j] field, a RoundUsage [i, j] field, and/or an IEComplete field. For a description of each field, refer to the description described above with reference to FIG. 9.

In an embodiment, the sub-block structure configuration information may include a number of blocks field for specifying the number of blocks, a block index field, and an instance for at least one sub-block. For example, referring to FIG. 12, the sub-block structure configuration information may include a number of blocks field 1201 for specifying the number of blocks, a block index field 1202 for specifying the index of the block, a first instance 1210-1 including sub-block information about the first block (block #0), . . . , an Nth instance 1210-N including sub-block information about the Nth block (block #N). The number of instances included in the sub-block structure configuration information may correspond to a value indicated by the number of blocks field.

Each instance may include configuration information about the sub-block(s) in the corresponding block. For example, the first instance 1210-1 may include configuration information about the sub block(s) of the first block, and the Nth instance 1210-N may include configuration information about the sub block(s) of the Nth block.

In an embodiment, the configuration information about the sub-block(s) may include all or some of fields included in the SubBlockDescriptorIE described above with reference to FIG. 9. For example, the configuration information about the sub-blocks may include a number of sub-blocks field (NumberofSubBlocks field) for specifying the number of sub-blocks, a sub-block index field for specifying the index of the corresponding sub-block for each sub-block, a number of rounds field (NumberofRounds [i] field) for specifying the number of rounds in the corresponding sub-block, a round index field for specifying the index of the corresponding round, and/or a number of slots field for specifying the length (e.g., slot unit) of the corresponding round (RoundDuration [i, j] field). For a description of each field, refer to the description of FIG. 9.

In an embodiment, the sub-block structure configuration information may be transmitted together with or separately from the ARC IE (or RBU IE).

In an embodiment, the sub-block structure configuration information may be included and transmitted in the payload IE field of the MAC frame together with or separately from the ARC IE (or RBU IE).

In an embodiment, the sub-block structure configuration information may be transmitted together with or separately from the ARC IE (or RBU IE) through the RCM, another control message, or another UWB message.

Meanwhile, a UWB device (controlee) capable of using only the ARC IE (i.e., a UWB device to which the sub-block structure configuration may not be applied) may configure the block structure using the ARC IE. The so-configured block structure may be the same as that illustrated in FIG. 7. In this case, the UWB device (responder) may predict in which slot of which round data is to be transmitted/received in the corresponding block structure through the ranging device management (RDM) IE.

Alternatively, the UWB device (controlee) capable of using the ARC IE and the SubBlockDescriptorIE (i.e., a UWB device capable of applying the sub-block structure configuration) may identify the sub-block structure through the SubBlockDescriptorIE and may configure the sub-block structure. The so-configured sub block structure may be the same as that illustrated in FIG. 9. In this case, the UWB device (responder) may predict in which slot of which round data is to be transmitted/received in the corresponding sub-block structure through the ranging device management (RDM) IE.

Figure 13:
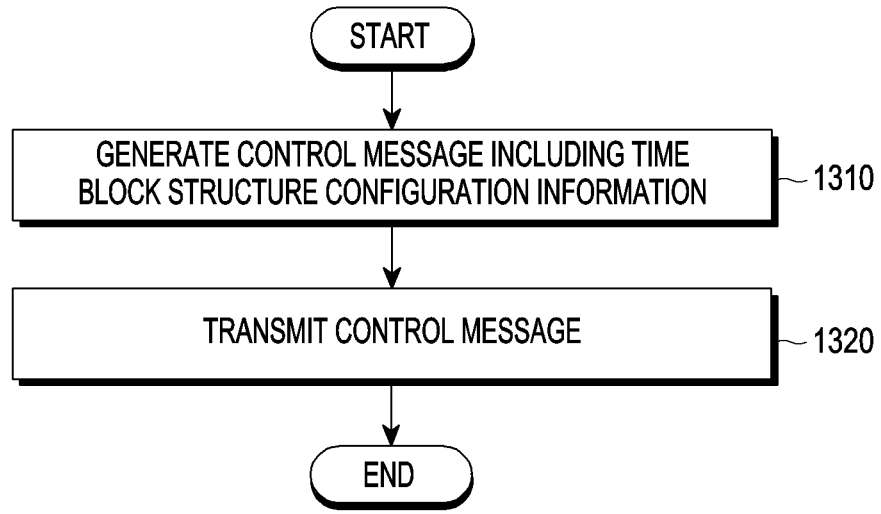
FIG. 13 is a flowchart illustrating a method for configuring a time block structure in a second UWB device by a first UWB device according to an embodiment of the disclosure.

FIG. 13 is a flowchart illustrating a method for configuring a time block structure in a second UWB device by a first UWB device according to an embodiment of the disclosure.

In the embodiment of FIG. 13, the first UWB device may be a UWB device having the device type of the controller, and the second UWB device may be a UWB device having the device type of the controlee.

Referring to FIG. 13, the first UWB device may generate a control message (or UWB message) including information (time block structure configuration information) for configuring a time block structure at operation 1310.

In an embodiment, the time block structure may be a hyper-block structure in which a hyper-block including a set of consecutive blocks is configured or a sub-block structure in which one block is divided into a plurality of sub-blocks.

The first UWB device may transmit a control message to the second UWB device at operation 1320.

In an embodiment, when the time block structure is the hyper-block structure, the information (e.g., HyperBlockDescriptorIE) for configuring the time block structure may include a field for specifying a length of the hyper-block, a field for specifying the number of all blocks in the hyper-block, and a field for specifying a length of each block in the hyper-block. The information about configuring the time block structure may further include a field for specifying a usage mode of each block in the hyper-block, a field for specifying the number of rounds for each block in the hyper-block, a field for specifying a length of each round in each block in the hyper-block, and a field for specifying a usage mode of each round in each block in the hyper-block. The information for configuring the time block structure may further include a field indicating whether the entire current hyper-block structure is described in the information about configuring the time block structure.

In an embodiment, when the time block structure is the sub-block structure, the information (e.g., SubBlockDescriptorIE) for configuring the time block structure may include a field for specifying a length of the block, a field for specifying the number of all sub-blocks in the block, and a field for specifying a length of each block in the block. The information for configuring the time block structure may include a field for specifying a usage mode of each sub-block in the block, a field for specifying the number of rounds for each sub-block in the block, a field for specifying a length of each sub-block in the block, and a field for specifying a usage mode of each round of each sub-block in the block. The information for configuring the time block structure may further include a field indicating whether the entire current sub-block structure is described in the information about configuring the time block structure.

Figure 14:
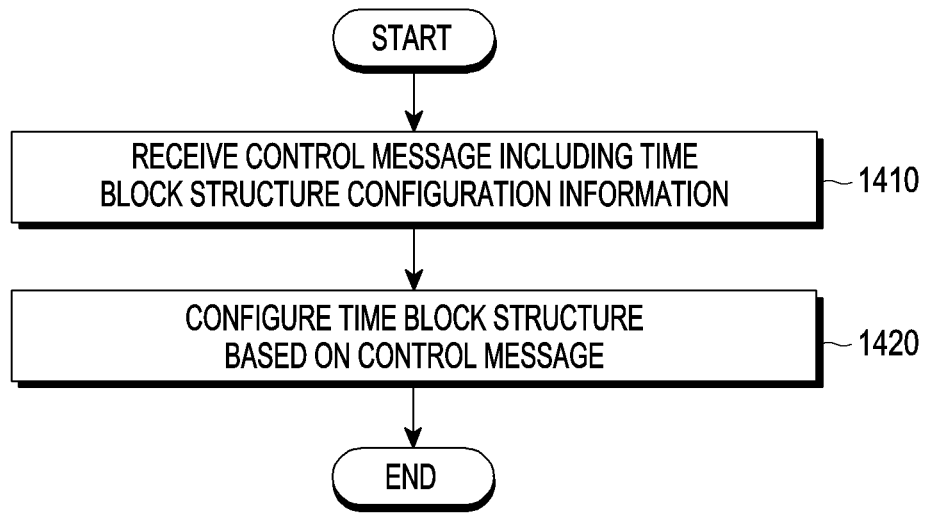
FIG. 14 is a flowchart illustrating a method for configuring a time block structure by a second UWB device according to an embodiment of the disclosure.

FIG. 14 is a flowchart illustrating a method for configuring a time block structure by a second UWB device according to an embodiment of the disclosure.

Referring to FIG. 14, the first UWB device may be a UWB device having the device type of the controller, and the second UWB device may be a UWB device having the device type of the controlee.

Referring to FIG. 14, the second UWB device may receive a control message (or UWB message) including information (time block structure configuration information) for configuring a time block structure at operation 1410.

In an embodiment, the time block structure may be a hyper-block structure in which a hyper-block including a set of consecutive blocks is configured or a sub-block structure in which one block is divided into a plurality of sub-blocks.

The second UWB device may configure the time block structure based on the information for configuring the time block structure in the control message at operation 1420.

In an embodiment, when the time block structure is the hyper-block structure, the information (e.g., HyperBlockDescriptorIE) for configuring the time block structure may include a field for specifying a length of the hyper-block, a field for specifying the number of all blocks in the hyper-block, and a field for specifying a length of each block in the hyper-block. The information about configuring the time block structure may further include a field for specifying a usage mode of each block in the hyper-block, a field for specifying the number of rounds for each block in the hyper-block, a field for specifying a length of each round in each block in the hyper-block, and a field for specifying a usage mode of each round in each block in the hyper-block. The information for configuring the time block structure may further include a field indicating whether the entire current hyper-block structure is described in the information about configuring the time block structure.

In an embodiment, when the time block structure is the sub-block structure, the information (e.g., SubBlockDescriptorIE) for configuring the time block structure may include a field for specifying a length of the block, a field for specifying the number of all sub-blocks in the block, and a field for specifying a length of each block in the block. The information for configuring the time block structure may include a field for specifying a usage mode of each sub-block in the block, a field for specifying the number of rounds for each sub-block in the block, a field for specifying a length of each sub-block in the block, and a field for specifying a usage mode of each round of each sub-block in the block. The information for configuring the time block structure may further include a field indicating whether the entire current sub-block structure is described in the information about configuring the time block structure.

Figure 17:
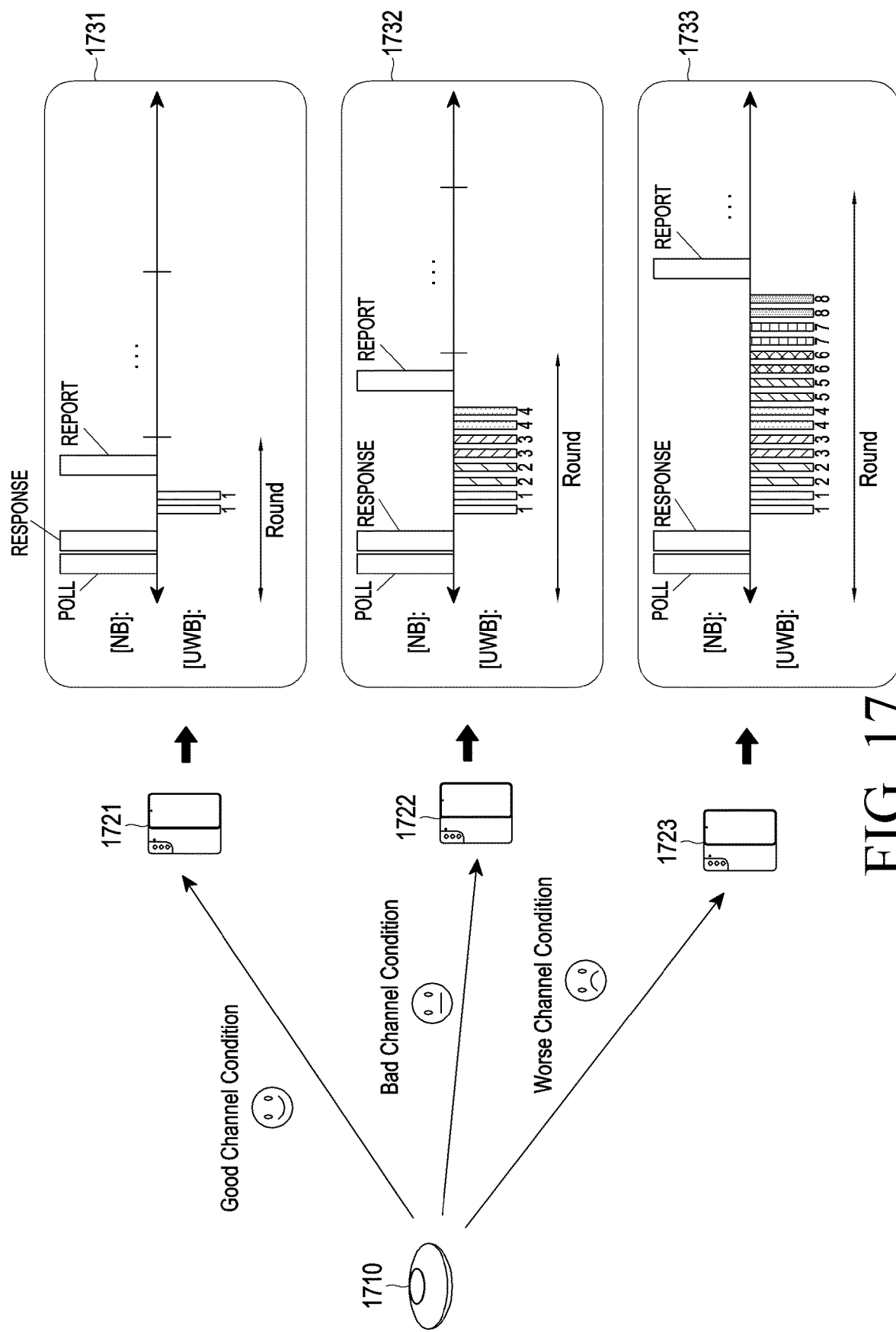
FIG. 17 illustrates an example of a multi-millisecond (MMS) UWB sequence according to a channel condition according to an embodiment of the disclosure.

FIG. 17 illustrates an example of an MMS UWB sequence according to a channel condition according to an embodiment of the disclosure.

As described above, in the case of MMS UWB (or NBA-MMS), multiple fragments may be transmitted. For example, in the case of MMS UWB (or NBA-MMS), the same fragment may be transmitted several times at preset intervals. As an embodiment, the number of transmissions of fragments in the MMS UWB (or NBA-MMS) may be different for each device. As an embodiment, the number of transmissions of fragment in MMS UWB (or NBA-MMS) may be determined based on the channel condition (state) (e.g., UWB channel state). For example, as the channel condition (state) is better, the number of transmissions of the fragment may decrease.

Referring to FIG. 17, it is assumed that the channel (e.g., UWB channel) between the first UWB device 1710 and the 2-1th UWB device 1721 has a good channel condition (a first channel condition), the channel (e.g., UWB channel) between the first UWB device 1710 and the 2-2th UWB device 1722 has a bad channel condition (a second channel condition worse than the first channel condition), and the channel (e.g., UWB channel) between the first UWB device 1710 and the 2-2th UWB device 1722 has a worse channel condition (a third channel condition worse than the second channel condition).

The first MMS UWB sequence 1731 represents an example of a message/packet sequence for the MMS UWB for the first UWB device 1710 and the 2-1th UWB device 1721 in one ranging round. Referring to the first MMS UWB sequence 1731, the first UWB device 1710 and the 2-1th UWB device 1721 each may transmit the fragment once through the UWB channel in the MMS UWB (or NBA-MMS) mode. For example, the first UWB device 1710 and/or the 2-1th UWB device 1721 may determine the number of transmissions of fragment in the MMS UWB (or NBA-MMS) mode as 1 based on the first channel condition, and each of the first UWB device 1710 and the 2-1th UWB device 1721 may transmit fragment #1 in the corresponding ranging round.

The second MMS UWB sequence 1732 represents an example of a message/packet sequence for the MMS UWB for the first UWB device 1710 and the 2-2th UWB device 1722 in one ranging round. Referring to the second MMS UWB sequence 1732, the first UWB device 1710 and the 2-2th UWB device 1722 each may transmit the fragment four times through the UWB channel in the MMS UWB (or NBA-MMS) mode. For example, the first UWB device 1710 and/or the 2-1th UWB device 1722 may determine the number of transmissions of fragment in the MMS UWB (or NBA-MMS) mode as 4 based on the second channel condition, and each of the first UWB device 1710 and the 2-2th UWB device 1722 may transmit fragments #1 to #4 in the corresponding ranging round.

The third MMS UWB sequence 1733 represents an example of a message/packet sequence for the MMS UWB for the first UWB device 1710 and the 2-3th UWB device 1723 in one ranging round. Referring to the second MMS UWB sequence 1733, the first UWB device 1710 and the 2-3th UWB device 1723 each may transmit the fragment eight times through the UWB channel in the MMS UWB (or NBA-MMS) mode. For example, the first UWB device 1710 and/or the 2-3th UWB device 1723 may determine the number of transmissions of fragment in the MMS UWB (or NBA-MMS) mode as 8 based on the third channel condition, and each of the first UWB device 1710 and the 2-2th UWB device 1723 may transmit fragments #1 to #8 in the corresponding ranging round.

As an embodiment, the spacings between fragments transmitted multiple times by one UWB device in one ranging round may be the same. For example, the spacing between fragments multiple times transmitted by one UWB device in one ranging round may be 1 ms. For example, in the second MMS UWB sequence 1732, the spacing between fragment #1 and fragment #2 transmitted by the first UWB device 1710, the spacing between fragment #2 and fragment #3, and the spacing between fragment #3 and fragment #3 may be 1 ms. For example, in the second MMS UWB sequence 1732, the spacing between fragment #1 and fragment #2 transmitted by the 2-2th UWB device 1722, the spacing between fragment #2 and fragment #3, and the spacing between fragment #3 and fragment #3 may be 1 ms.

Referring to FIG. 17, since the number of transmissions of fragments in the MMS UWB (or NBA-MMS) mode is different according to the channel condition, the length of the ranging block/ranging round needs to be set to differ according to the channel condition. For example, as the channel condition is better, the length of the ranging round for the MMS UWB (or NBA-MMS) mode may be set to be shorter and, as the channel condition is worse, the length of the ranging round for the MMS UWB (or NBA-MMS) mode may be set to be longer. For example, the length of the ranging round allocated for the first UWB device 1710 and the second-first UWB device 1721 having the first channel condition may be set to be shorter than the length of the ranging round allocated for the first UWB device 1710 and the second-second UWB device 1722 having the second channel condition which is worse than the first channel condition.

As such, when the MMS UWB (or NBA-MMS) mode is used, the time structure needs to be flexibly set for each channel condition or for each device. This may be provided through the above-described hyper-block structure.

Hereinafter, an example of using a hyper-block structure for MMS UWB (or NBA-MMS) is described with reference to FIGS. 18 and 19.

Figure 18:
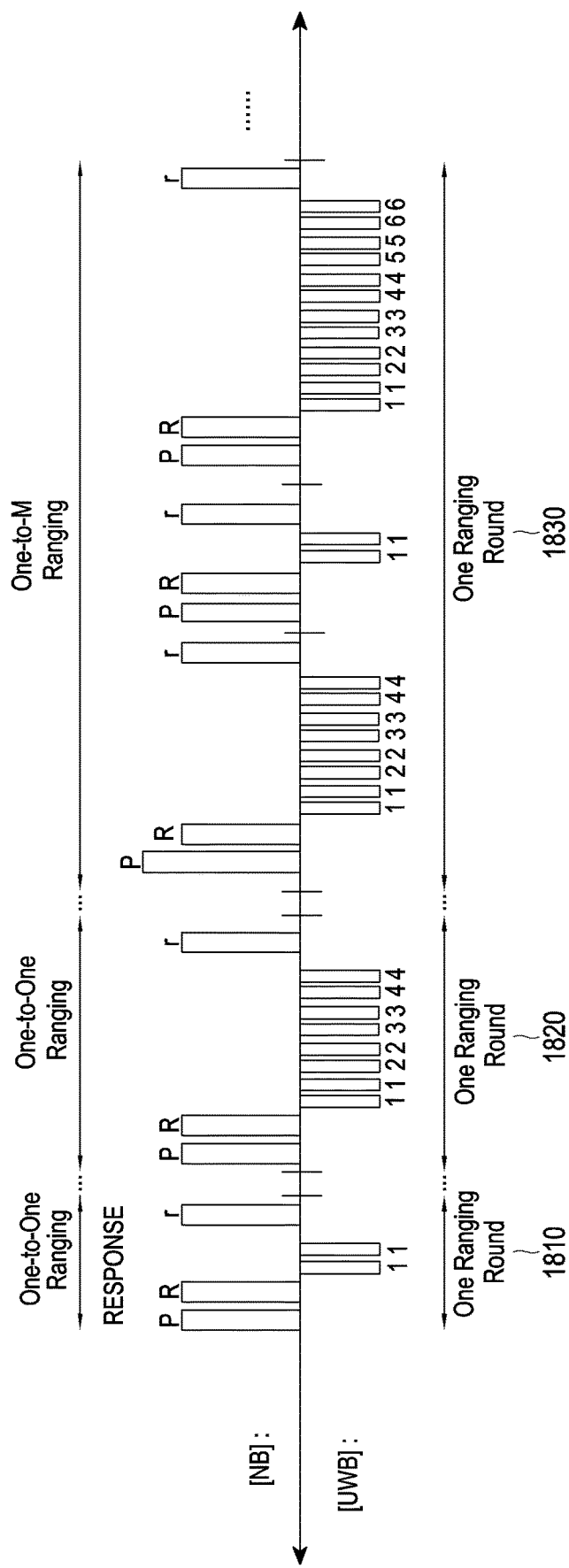
FIG. 18 illustrates an example of using a hyper-block structure for MMS UWB according to an embodiment of the disclosure.

FIG. 18 illustrates an example of using a hyper-block structure for MMS UWB according to an embodiment of the disclosure.

Referring to FIG. 18, it is assumed that a plurality of ranging modes may be supported in the session. As an embodiment, one session may be set to a combination of multiple different ranging modes. For example, as illustrated, in one session, the first ranging round 1810 may be configured to support a one-to-one ranging mode, the second ranging round 1820 may be configured to support a one-to-one ranging mode different from the first ranging round 1810, and the third ranging round 1830 may be configured to support a one-to-many (M) ranging mode. In this case, ranging rounds of different blocks may have different lengths from other ranging rounds to support different ranging modes.

As an embodiment, the first ranging round 1810, the second ranging round 1820, and the third ranging round 1830 may be included in one hyper-block structure. As an embodiment, the first ranging round 1810, the second ranging round 1820, and the third ranging round 1830, respectively, may be included in different ranging blocks in each hyper-block having the same hyper-block structure. For example, the first ranging round 1810, the second ranging round 1820, and the third ranging round 1830, respectively, may be included in different ranging blocks in the first hyper-block.

As an embodiment, the length of the first ranging round 1810 may be set to be different from the length of the second ranging round 1820 and/or the length of the third ranging round 1830. For example, the length of the second ranging round 1820 may be set to be longer than the length of the first ranging round 1810, and the length of the third ranging round 1830 may be set to be longer than the length of the second ranging round 1820.

Meanwhile, in the embodiment of FIG. 18, the message indicated by "P" indicates a poll message, the message indicated by "R" indicates a response message, and the message indicated by "r" indicates a report message.

Hereinafter, an example of an operation for configuring a hyper-block structure and performing an NBA-MMS UWB mode using the corresponding hyper-block structure is described.

(0) Hyper-Block Structure Configuration

The controller may transmit configuration information (hyper-block structure configuration information) for configuring a hyper-block structure for the corresponding session. The hyper-block structure configuration information may be, e.g., the hyper-block structure configuration information of FIG. 10.

As an embodiment, the controller may transmit the hyper-block structure configuration information through UWB or NB. For example, the controller may transmit an RCM including hyper-block structure configuration information through UWB. For example, the controller may transmit a control message including hyper-block structure configuration information through the NB.

As an embodiment, the hyper-block structure configuration information may be set as a parameter value to have the hyper-block structure as shown in FIG. 18. In an embodiment, the hyper-block structure configuration information may include a field (a field related to a multi-transmission mode) including information for notifying that the corresponding ranging round or the corresponding ranging block is used in the MMS mode, the multi-transmission mode, or the NBA-MMS mode.

For example, parameters (e.g., the Ranging Block Duration field, the Ranging Round Duration field, the Multi Node Mode field, the Ranging Round Usage field, the multi-transmission mode-related field, etc.) corresponding to the first ranging round 1810 (or a ranging block including the first ranging round 1810) in the hyper-block structure configuration information may be set as values so that the first ranging round 1810 has the first round duration and is used for one-to-one ranging, and SS-TWR mode and NBA-MMS mode are applied.

For example, parameters (e.g., the Ranging Block Duration field, the Ranging Round Duration field, the Multi Node Mode field, the Ranging Round Usage field, the multi-transmission mode-related field, etc.) corresponding to the second ranging round 1820 (or a ranging block including the second ranging round 1820) in the hyper-block structure configuration information may be set as values so that the second ranging round 1820 has the second round duration longer than the first round duration and is used for one-to-one ranging, and SS-TWR mode and NBA-MMS mode are applied.

For example, parameters (e.g., the Ranging Block Duration field, the Ranging Round Duration field, the Multi Node Mode field, the Ranging Round Usage field, the multi-transmission mode-related field, etc.) corresponding to the third ranging round 1830 (or a ranging block including the third ranging round 1830) in the hyper-block structure configuration information may be set as values so that the third ranging round 1830 has the third round duration longer than the second round duration and is used for one-to-many ranging, and SS-TWR mode and NBA-MMS mode are applied.

(1) NBA-MMS UWB Sequence in the First Ranging Round 1810

The first ranging round 1810 may be a ranging round allocated for initiator #1 and responder #1. In the first ranging round 1810, the one-to-one ranging mode, the NBA-MMS mode, and/or the SS-TWR mode may be applied.

As an embodiment, in the first ranging round 1810, the number of transmissions of fragments in the MMS UWB (or NBA-MMS) mode may be set to 1. The number of transmissions of fragments in the first ranging round 1810 may be set by the controller or initiator #1.

Initiator #1 may transmit (or broadcast) a poll message through an NB channel. In an embodiment, initiator #1 may transmit (or broadcast) a poll message in a first ranging slot (e.g., the first ranging slot (ranging slot index #0)) of the first ranging round 1810. Accordingly, the ranging round or UWB ranging may be started. As an embodiment, the poll message may include configuration information (e.g., scheduling information, multi-transmission count/period information, etc.) for multiple transmissions.

Responder #1 may transmit a response message to initiator #1 through the NB channel in response to the poll message. In an embodiment, responder #1 may transmit a response message in a second ranging slot of the first ranging round 1810 (e.g., a ranging slot (e.g., ranging slot index #1) immediately following the ranging slot in which the poll message is transmitted). Accordingly, fragment transmission for MMS UWB may be triggered.

Initiator #1 may transmit a first fragment to responder #1 through the UWB channel. In an embodiment, initiator #1 may transmit the first fragment in the third ranging slot of the first ranging round 1810 (e.g., a ranging slot (e.g., ranging slot index #2) immediately following the ranging slot in which the response message is transmitted). In the disclosure, the first fragment may be referred to as a first fragment packet or a first packet.

Responder #1 may transmit the first response fragment to initiator #1 through the UWB channel in response to the first fragment. In an embodiment, responder #1 may transmit the first response fragment in the same ranging slot (e.g., ranging slot index #2) as the ranging slot in which the first fragment of the first ranging round 1810 is transmitted. In the disclosure, the first response fragment may be referred to as a first response fragment packet or a first response packet.

The first fragment and the first response fragment may be used for TWR (e.g., SS-TWR). As an embodiment, the first fragment may be transmitted at the start time of the corresponding ranging slot, and the first response fragment may be transmitted at the time away by a preset offset from the start time of the corresponding ranging slot.

The first fragment and the first response fragment may include an RSF or an RIF. As an embodiment, the sequence data included in the first fragment and the sequence data included in the second fragment may be the same or different.

Initiator #1 may perform ranging measurement based on the first fragment and the first response fragment. For example, initiator #1 may calculate a ToF based on SS-TWR using the first fragment and the first response fragment, and obtain distance information between initiator #1 and responder #1 based on the ToF.

Initiator #1 may transmit a report message including the result of the ranging measurement to responder #1 through the NB channel.

Meanwhile, according to an embodiment, the NBA-MMS UWB sequence described above may be performed in a different order from that illustrated, transmission of some messages/packets may be omitted, or transmission of additional messages/packets may be further performed.

(2) NBA-MMS UWB Sequence in the Second Ranging Round 1820

The second ranging round 1820 may be a ranging round allocated for initiator #2 and responder #2. In the second ranging round 1820, the one-to-one ranging mode, the NBA-MMS mode, and/or the SS-TWR mode may be applied.

As an embodiment, in the first ranging round 1810, the number of transmissions of fragments in the MMS UWB (or NBA-MMS) mode may be set to 4. The number of transmissions of fragments in the first ranging round 1810 may be set by the controller or initiator #2.

The NBA-MMS UWB sequence in the second ranging round 1820 may be the same as the NBA-MMS UWB sequence in the first ranging round 1810, except for a difference in the number of transmissions of fragments. Accordingly, the description of the NBA-MMS UWB sequence in the first ranging round 1810 may be referred to.

Initiator #2 may transmit (or broadcast) a poll message through an NB channel. In an embodiment, initiator #2 may transmit (or broadcast) a poll message in a first ranging slot (e.g., the first ranging slot (ranging slot index #0)) of the second ranging round 1820. As an embodiment, the poll message may include configuration information (e.g., scheduling information, multi-transmission count/period information, etc.) for multiple transmissions.

Responder #2 may transmit a response message to initiator #1 through the NB channel in response to the poll message. In an embodiment, responder #1 may transmit a response message in a second ranging slot of the second ranging round 1820 (e.g., a ranging slot (e.g., ranging slot index #1) immediately following the ranging slot in which the poll message is transmitted).

Initiator #2 may transmit a fragment to responder #2 through the UWB channel four times. In an embodiment, initiator #1 may transmit the first fragment, the second fragment, the third fragment, and the fourth fragment, respectively, in four ranging slots (e.g., ranging slot indexes #2, #3, #4, and #5) immediately following the third ranging slot (e.g., ranging slot in which the response message is transmitted) of the second ranging round 1820, respectively.

Responder #2 may transmit a response message to initiator #2 through the UWB channel four times in response to each fragment. In an embodiment, responder #2 may transmit the first response fragment, the second response fragment, the third response fragment, and the fourth response fragment in the same ranging slots (e.g., ranging slot indexes #2, #3, #4, and #5) as those of the ranging slot in which the corresponding fragment of the second ranging round 1820 is transmitted.

The fragments and the response fragments may be used for TWR (e.g., SS-TWR). As an embodiment, the fragment of the initiator may be transmitted at the start time of the corresponding ranging slot, and the response fragment of the responder may be transmitted at the time away by a preset offset from the start time of the corresponding ranging slot.

The fragment and the response fragment may include an RSF or an RIF. As an embodiment, the sequence data included in the first fragment and the sequence data included in the second fragment may be the same or different. As an embodiment, the sequence data included in the first fragment, the second fragment, the third fragment, and the fourth fragment may be the same or different. As an embodiment, the sequence data included in the first response fragment, the second response fragment, the third response fragment, and the fourth response fragment may be the same or different.

Initiator #2 may perform ranging measurement based on pairs of fragment and response fragment. For example, initiator #2 may calculate a ToF based on SS-TWR using pairs of fragment and response fragment, and obtain distance information between initiator #2 and responder #2 based on the ToF.

Initiator #2 may transmit a report message including the result of the ranging measurement to responder #2 through the NB channel.

Meanwhile, according to an embodiment, the NBA-MMS UWB sequence described above may be performed in a different order from that illustrated, transmission of some messages/packets may be omitted, or transmission of additional messages/packets may be further performed.

(3) NBA-MMS UWB Sequence in the Third Ranging Round 1830

The third ranging round 1830 may be a ranging round allocated for initiator #3 and a plurality of responders (e.g., responder #3, responder #4, and responder #5). In the third ranging round 1830, the one-to-many ranging mode, the NBA-MMS mode, and/or the SS-TWR mode may be applied.

In the third ranging round 1830, one initiator and each responder may perform separate MMS UWB (or NBA-MMS). In the third ranging round 1830, initiator #3 and responder #3 may set the number of transmissions of fragments in the MMS UWB (or NBA-MMS) mode to 4, initiator #3 and responder #4 may set the number of transmissions of fragments in the MMS UWB (or NBA-MMS) mode to 1, and initiator #3 and responder #5 may set the number of transmissions of fragments in the MMS UWB (or NBA-MMS) mode to 6.

As an embodiment, as illustrated, in the third ranging round 1830, the NBA-MMS UWB sequence operations with initiator #3 and each responder may be sequentially performed. For example, after the first NBA-MMS UWB sequence operation between initiator #3 and responder #3 is performed, the first NBA-MMS UWB sequence operation between initiator #3 and responder #4 may be performed, and then the first NBA-MMS UWB sequence operation between initiator #3 and responder #5 may be sequentially performed. Each sequence operation may be described as follows.

(3-1) First NBA-MMS UWB Sequence Between Initiator #3 and Responder #3

The first NBA-MMS UWB sequence operation between initiator #3 and responder #3, in which the number of transmissions of fragments in the MMS UWB (or NBA-MMS) mode is set to 4, may be the same as the NBA-MMS UWB sequence operation in the second ranging round 1820 described above. Accordingly, the above description of the NBA-MMS UWB sequence operation in the second ranging round 1820 may be referred to.

(3-2) Second NBA-MMS UWB Sequence Between Initiator #3 and Responder #4

The first NBA-MMS UWB sequence operation between initiator #3 and responder #4, in which the number of transmissions of fragments in the MMS UWB (or NBA-MMS) mode is set to 1, may be the same as the NBA-MMS UWB sequence operation in the first ranging round 1810 described above. Accordingly, the above description of the NBA-MMS UWB sequence operation in the first ranging round 1810 may be referred to.

(3-3) Third NBA-MMS UWB Sequence Between Initiator #3 and Responder #5

The third NBA-MMS UWB sequence operation between initiator #3 and responder #5, in which the number of transmissions of fragments in the MMS UWB (or NBA-MMS) mode is set to 6, may be the same as the NBA-MMS UWB sequence operation in the second ranging round 1820 described above except for a difference in the number of transmissions of fragments. Accordingly, the above description of the NBA-MMS UWB sequence operation in the second ranging round 1820 may be referred to.

Meanwhile, according to an embodiment, the NBA-MMS UWB sequence described above may be performed in a different order from that illustrated, transmission of some messages/packets may be omitted, or transmission of additional messages/packets may be further performed.

In the above-described embodiments, for convenience of description, initiators/responders in each ranging round are distinguished from each other, but the disclosure is not limited thereto. For example, one UWB device may operate as an initiator in a plurality of ranging rounds, or one UWB device may operate as a responder in a plurality of ranging rounds. Further, in the above-described embodiments, controller/controlee and initiator/responder are distinguished from each other, but this is merely for distinguishing corresponding functions, and it is obvious that one UWB device may operate as a controller/initiator, controller/responder, controlee/initiator, or controlee/responder.

Figure 19:
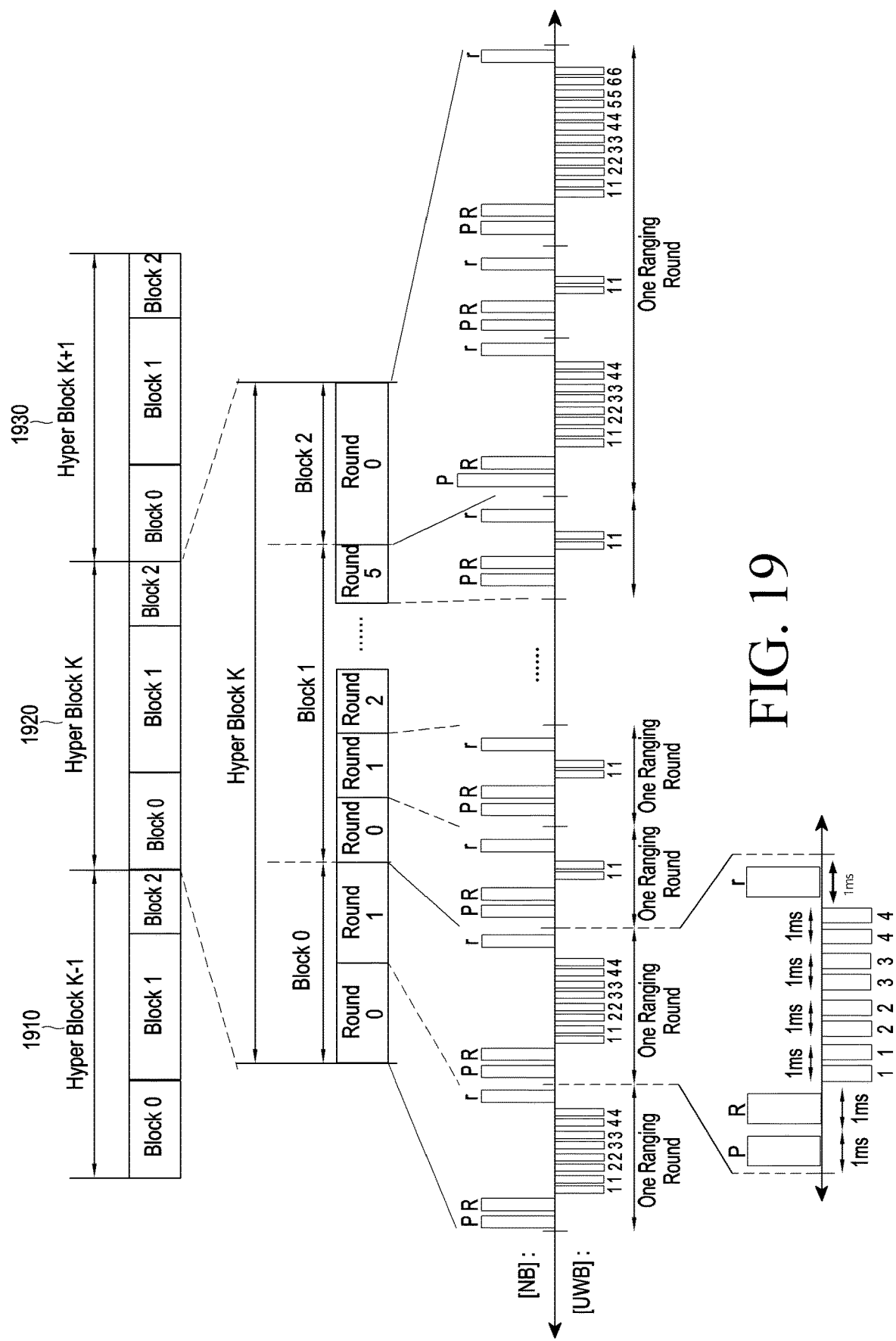
FIG. 19 illustrates an example of a structure of a hyper-block structure used for MMS UWB according to an embodiment of the disclosure.

FIG. 19 illustrates an example of a hyper-block structure used for MMS UWB according to an embodiment of the disclosure.

The controller may generate configuration information (hyper-block structure configuration information) for configuring the hyper-block structure for the corresponding session, and transmit the hyper-block structure configuration information to at least one controlee. The hyper-block structure configuration information may be, e.g., the hyper-block structure configuration information of FIG. 10. Accordingly, e.g., a hyper-block structure as shown in FIG. 19 may be configured for the corresponding session. The so-configured hyper-block structure may be continuously used by UWB devices in which the session is configured, until the session is changed or terminated. The update of the hyper-block structure may be performed by hyper-block structure update information (e.g., the hyper-block structure update information of FIG. 11).

Meanwhile, in the embodiment of FIG. 19, the message indicated by "P" indicates a poll message, the message indicated by "R" indicates a response message, and the message indicated by "r" indicates a report message.

Referring to FIG. 19, one hyper-block structure configured by one hyper-block structure configuration information may be continuous of hyper-blocks. As shown, the hyper-block structure may be a sequence of hyper-block K−1 1910, hyper-block K 1920, and hyper-block K+1 1930.

Each of the hyper-blocks 1910, 1920, and 1930 may have the same time structure. For example, each hyper-block may include ranging block 0 (block 0), ranging block 1 (block 1), and ranging block 2 (block 2). In other words, the structures of ranging block 0, ranging block 1, and ranging block 2 included in hyper-block K−1 1910 set by the same hyper-block structure configuration information may be the same as the structures of ranging block 0, ranging block 1, and ranging block 2, respectively, included in hyper-block K 1920.

Hereinafter, the structure of the ranging block in each hyper-block is described by taking hyper-block K 1920 as an example. The description is equally applicable to other hyper-blocks.

hyper-block K 1920 may include ranging block 0, ranging block 1, and ranging block 2.

Ranging block 0 may include ranging round 0 and ranging round 1. The configuration for each ranging round of ranging block 0 may be the same as the configuration for the first ranging round 1810 of FIG. 18. Accordingly, the NBA-MMS UWB sequence operation in each ranging round of ranging block 0 may be the same as the NBA-MMS UWB sequence operation in the first ranging round 1810 of FIG. 18.

Ranging block 1 may include six ranging rounds, i.e., ranging rounds 0 to 5. The configuration for each ranging round of ranging block 1 may be the same as the configuration for the second ranging round 1820 of FIG. 18. Accordingly, the NBA-MMS UWB sequence operation in each ranging round of ranging block 1 may be the same as the NBA-MMS UWB sequence operation in the second ranging round 1820 of FIG. 18.

Ranging block 2 may include one ranging round (ranging round 0). The configuration for the ranging round of ranging block 2 may be the same as the configuration for the third ranging round 1830 of FIG. 18. Accordingly, the NBA-MMS UWB sequence operation in the ranging round of ranging block 2 may be the same as the NBA-MMS UWB sequence operation in the third ranging round 1830 of FIG. 18.

Hereinafter, the structure of the ranging slot in the ranging round is described by taking ranging round 1 of ranging block 0 as an example.

Referring to ranging round 1 of ranging block 0, one ranging round may include a plurality of ranging slots, and the length of each ranging slot may be set to a preset length (e.g., 1 millisecond (ms)).

One ranging message (e.g., poll message, response message, or report message) may be transmitted through the NB channel in one ranging slot.

A plurality of fragments (e.g., two fragments (e.g., the fragment of the initiator and the response fragment of the responder) may be transmitted in one ranging slot. As an embodiment, the fragment of the initiator may be transmitted at the start time of the corresponding ranging slot, and the response fragment of the responder may be transmitted at the time away by a preset offset from the start time of the same ranging slot.

The fragment/response fragment may be transmitted in a plurality of ranging slots according to the configuration (MMS transmission).

Figure 20:
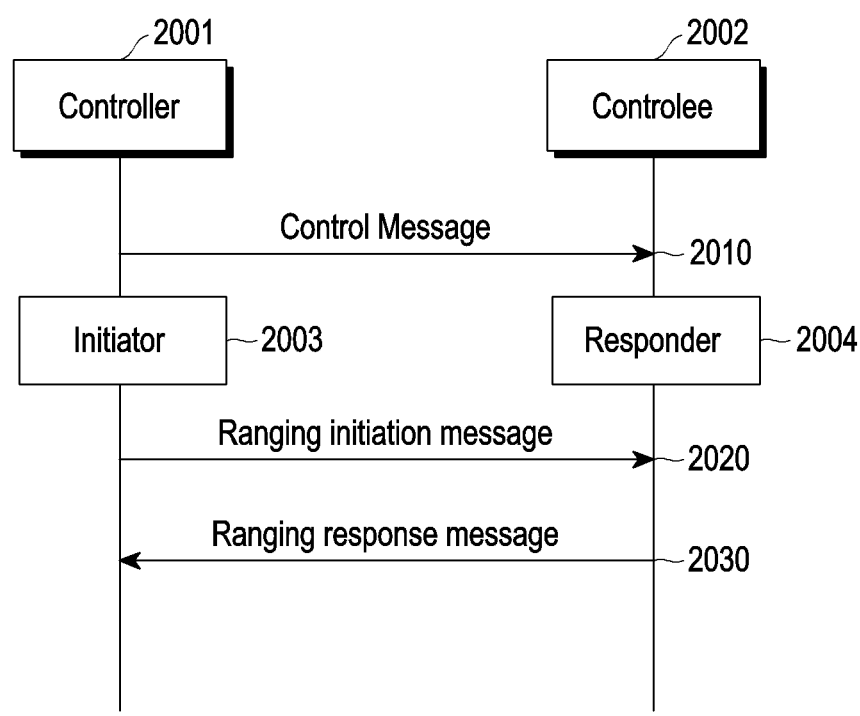
FIG. 20 illustrates roles of devices in UWB ranging according to an embodiment of the disclosure.

FIG. 20 illustrates roles of devices in UWB ranging according to an embodiment of the disclosure.

The device according to the embodiment of FIG. 20 may be an example of the UWB device of FIG. 1.

In the disclosure, a controller 2001 may be a ranging device that transmits a control message 2010 to define and control ranging characteristics. A controlee 2002 may be a ranging device that receives a control message 2010 from the controller and utilizes a ranging function as configured in the control message 2010.

An initiator 2003 may be a ranging device that initiates ranging exchange by transmitting a first RFRAME, which is a ranging initiation message (RIM) 2020. A responder 2004 may be a ranging device that reacts to the ranging initiation message 2020 received from the initiator 2003 to transmit a ranging response message (RRM) 2030.

The controller 2001 and the initiator 2003 may be the same device. The controlee 2002 and the responder 2004 may be the same device.

In the disclosure, the two-way ranging (TWR) scheme corresponds to a method in which the UWB devices exchange ranging messages therebetween to calculate the time of flight (ToF) and determine the location of the UWB device based thereon. ToF may indicate the UWB propagation time between the transmitter and the receiver. The UWB device may estimate a relative distance between two devices by the ToF through precise timestamp.

Figure 21:
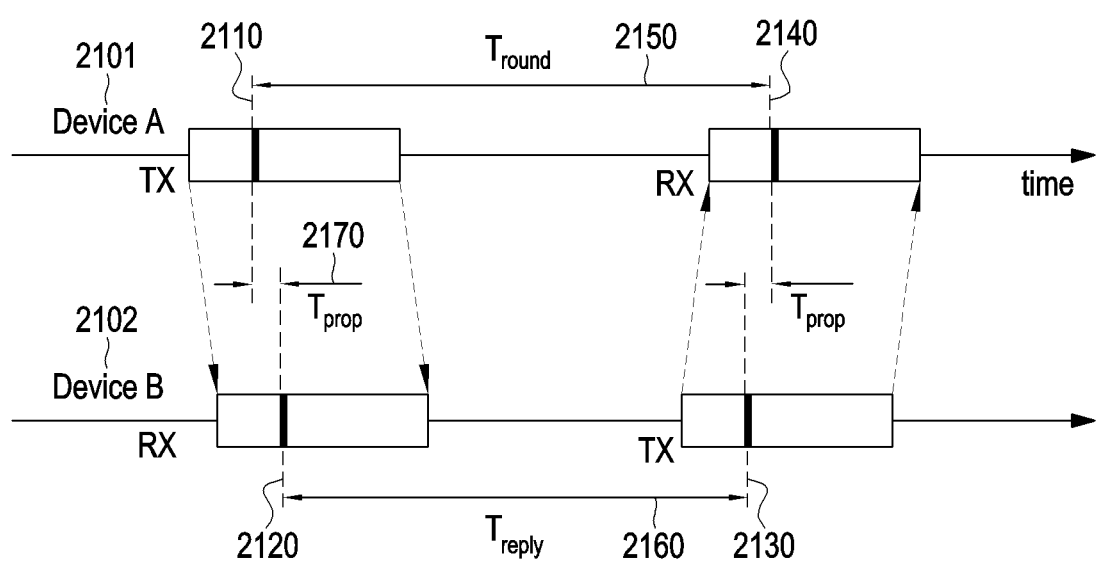
FIG. 21 is a view illustrating a single-sided two-way ranging (SS-TWR) scheme among the UWB ranging schemes according to an embodiment of the disclosure.

FIG. 21 is a view illustrating a single-sided two-way ranging (SS-TWR) scheme among the UWB ranging schemes according to an embodiment of the disclosure.

The device according to the embodiment of FIG. 21 may be an example of the UWB device of FIG. 1.

Single-sided two-way ranging (SS-TWR) proposed in the disclosure may be a method for measuring a round-trip delay between a single message transmitted from one device to another device and a response transmitted back to the original device.

Referring to FIG. 21, in SS-TWR, device A 2101 may transmit a message (e.g., RIM) for initiating ranging, and device B 2102 may send a response thereto. Each of the devices 2101 and 2102 may accurately time-stamp the transmission/reception times of message frames and may calculate $T_{prop}$ 2170 which is the ToF value by calculating half the time obtained by subtracting $T_{reply}$ 2160 which indicates the time from the time 2120 when device B 2102 receives the RIM message from device A 2101 to the time 2130 of transmission of the response message from $T_{round}$ 2150 which indicates the time from the time 2110 of transmission of the RIM by device A 2101 to the time 2140 of reception of the response message from device B 2102.

The specific formula is as follows.

$$\hat{T}_{prop} = \frac{1}{2}(T_{round} - T_{reply}) \quad \text{Equation 1}$$

FIG. 22 illustrates an example ranging round structure performing SS-TWR according to an embodiment of the disclosure.

The device according to the embodiment of FIG. 22 may be an example of the UWB device of FIG. 1.

The embodiment of FIG. 22 assumes that the scheduling mode is a contention-based mode, that is, a scheduling mode in which contention-based raging is performed.

Referring to FIG. 22, in contention-based raging, a ranging round may include a period for transmitting a RIM and a contention period 2205. In contention-based raging, each responder may select a random slot within the contention period and transmit its own response message.

The contention period may be a period during which responders perform contention-based responses. The contention period may include at least one ranging slot. For example, as shown, the contention period may include M ranging slots. As an embodiment, configuration information for setting the contention period may be included in the RCM transmitted by the controller or the RIM transmitted by the initiator and be transmitted.

In contention-based raging, each responder may select a random slot within the contention period and transmit its own response message (RRM). For example, as shown, responder 1 may arbitrarily select ranging slot 1 2202 within the contention period upon receiving a ranging initiation message in slot 0 2201 and transmit its own response message in ranging slot 1, responder 2 may arbitrarily select ranging slot 2 2203 within the contention period and transmit its own response message in ranging slot 2, and responder K may arbitrarily select ranging slot M 2204 within the contention period and transmit its own response message in ranging slot 1.

When response messages do not collide between the responders, the initiator may successfully receive the corresponding response message. The initiator anchor may calculate the ToF based on the successfully received response message.

FIG. 23 is a diagram of SS-TWR message transmission/reception according to an embodiment of the disclosure.

The device according to the embodiment of FIG. 23 may be an example of the UWB device of FIG. 1.

Referring to FIG. 23, when the initiator device transmits a ranging initiation message in slot 0, the responder device may transmit a response message in slots 1 through M. In slot 1 to slot M, the responder device may transmit a response message based on contention or scheduling, and the initiator device may calculate the ToF through the method disclosed in FIG. 21 through the message received from the responder device.

However, the ToF measured through Equation 1 of FIG. 21 corresponds to the ToF calculated in an ideal situation in which the respective clocks of the devices are completely synchronized. However, in a real situation, the ranging error may increase as the reply time of the responder increases. In other words, the ranging error may increase according to the effect of clock drift between the initiator device and the responder device. When ε is the clock frequency offset (CFO) between the initiator device and the responder device, the actual ToF needs to be calculated as in Equation 2.

$$\hat{T}_{prop} = \frac{1}{2}(T_{round} - T_{reply}(1 + \varepsilon)) = \frac{1}{2}(T_{round} - T_{reply}) \frac{1}{2} T_{reply} \cdot \varepsilon \quad \text{Equation 2}$$

Accordingly, various methods are attempted reduce the ranging error by correcting the CFO as described above.

Figure 24:
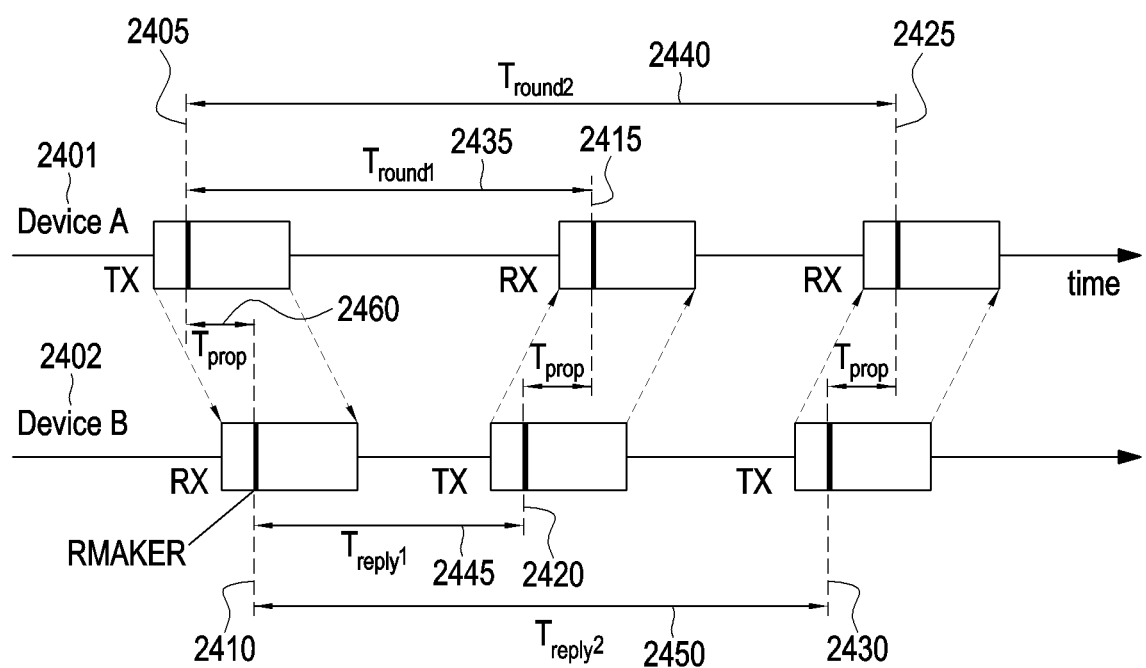
FIG. 24 is a view illustrating a single-sided two-way ranging (SS-TWR) scheme according to an embodiment of the disclosure.

FIG. 24 is a view illustrating a single-sided two-way ranging (SS-TWR) scheme according to an embodiment of the disclosure.

The device according to the embodiment of FIG. 24 may be an example of the UWB device of FIG. 1.

Referring to FIG. 24, in SS-TWR, device A 2401 may transmit a message for initiating ranging, and device B 2402 may send a response for ranging twice. Each of the devices 2401 and 2402 may accurately time-stamp the transmission/reception times of message frames and may calculate $T_{prop}$ which is the ToF value by calculating half the time obtained by subtracting $T_{reply}$ 2445 and 2450 which indicates the time from the time 2410 and 2420 when device B 2402 receives the RIM message from device A 2401 to the time 2430 of transmission of the response message from $T_{round}$ 2435 and 2440 which indicates the time from the time 2405 of transmission of the RIM by device A 2101 to the time 2415 and 2425 of reception of the response message from device B 2402. However, in the embodiment of FIG. 24, since device B 2402 sends the response message twice, there are two times when device A 2401 receives the response message, and $T_{round1}$ 2435 and $T_{round2}$ 2440 may be determined accordingly. Further, since device B 2402 receives the RIM message and transmits the response message twice, $T_{reply1}$ 2445 for the first response signal and $T_{reply2}$ 2450 for the second response signal may be determined. To correct the CFO, if the clock of the responder device is assumed to be earlier than the clock of the initiator device, the ToF 2460 may be calculated by correcting the CFO as in the following equation using $T_{round2}-T_{round1}$ and $T_{reply2}-T_{reply1}$.

$$\hat{T}_{prop} = \frac{1}{2}[T_{round1} - \delta \cdot T_{reply1}] \quad \text{Equation 3}$$

Here, δ is a CFO correction coefficient and may be expressed as in the following equation.

$$\delta = \frac{T_{round2} - T_{round1}}{T_{reply2} - T_{reply1}} = \frac{1}{1+\varepsilon} \quad \text{Equation 4}$$

Figure 25:
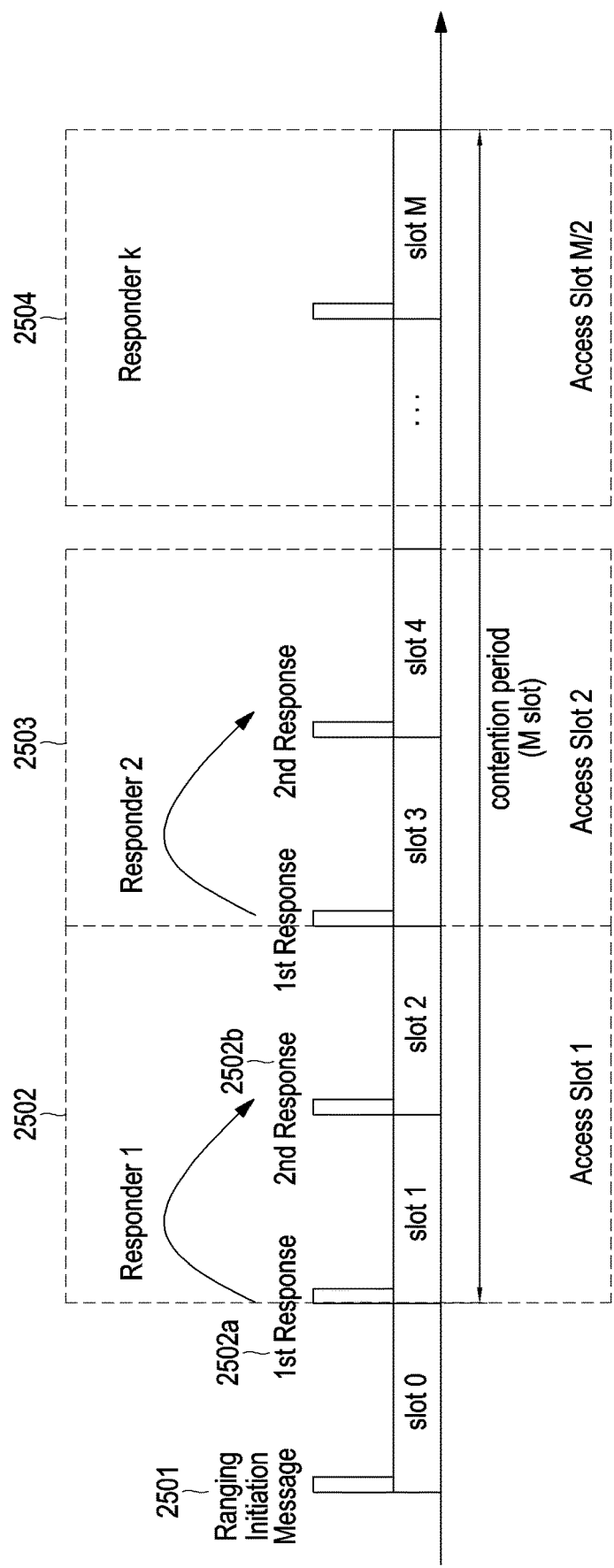
FIG. 25 illustrates an example ranging round structure performing SS-TWR according to an embodiment of the disclosure.

FIG. 25 illustrates an example ranging round structure performing SS-TWR according to an embodiment of the disclosure.

The device according to the embodiment of FIG. 25 may be an example of the UWB device of FIG. 1.

Referring to FIG. 25, a ranging round may include a plurality of ranging slots and slot 0 in which ranging initiation message 2501 is received. For example, as shown, the ranging round may include one ranging slot for RIM and M ranging slots for contention-based access (ranging).

It is assumed that the SS-TWR of the embodiment of FIG. 25 follows the SS-TWR of FIG. 24. Therefore, when responder devices transmit response messages, they should transmit response messages twice in two consecutive slots. Here, the two consecutive slots are defined as access slots. When one of the two slots is a slot for the first response signal, the other slot may be a slot for the second response signal. For example, the response messages transmitted by responder 1 2502 may be divided into a first response message 2502a and a second response message 2502b. Accordingly, the responder devices 2502, 2503, and 2504 may compete in M/2 access slots, which are half of the total M slots in the contention period, and randomly transmit response messages. The consecutive response signals from one responder device may compensate for clock drift between the initiator and the responder, so that ranging accuracy may be enhanced.

Meanwhile, for certain use cases, it may be preferable to allow the initiator device to calculate the range for the responder device. In the case, in order for the responder device to know the ranging result, the initiator device may need to transmit the ranging result in an additional slot. In this case, the access slot may include a total of 3 slots that include 2 slots for a response signal and 1 slot for a ranging result report message.

Figure 26:
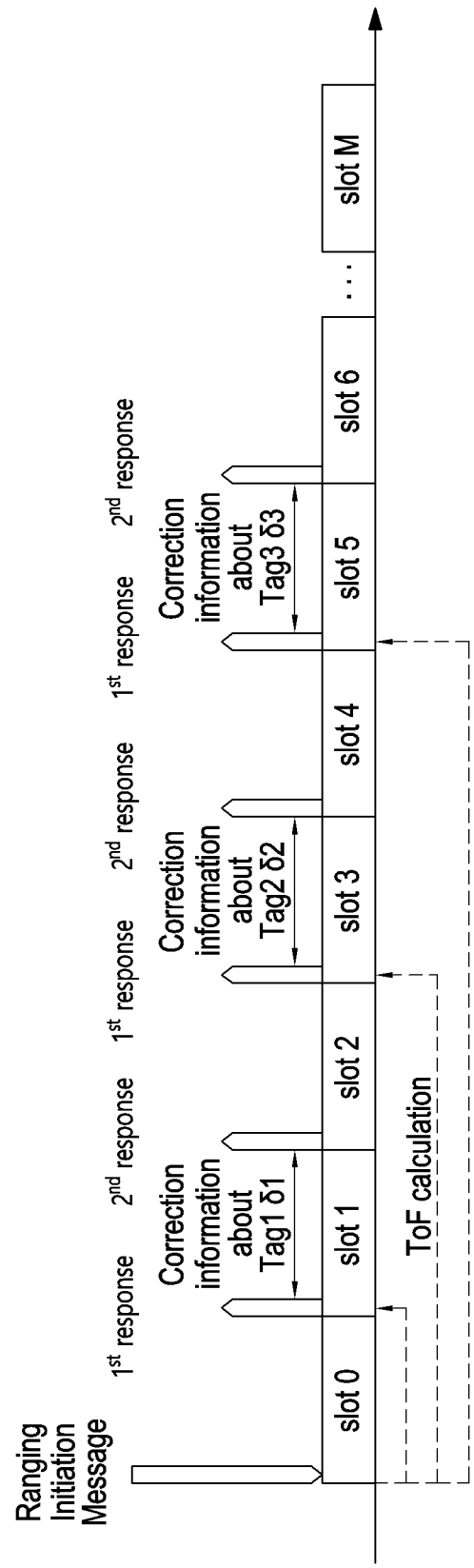
FIG. 26 is a diagram of SS-TWR message transmission/reception according to an embodiment of the disclosure.

FIG. 26 is a diagram of SS-TWR message transmission/reception according to an embodiment of the disclosure.

The device according to the embodiment of FIG. 26 may be an example of the UWB device of FIG. 1.

Referring to FIG. 26, when the initiator device transmits a ranging initiation message in slot 0, the responder device may transmit a response message based on contention or scheduling in slots 1 through M.

It is assumed that the SS-TWR of the embodiment of FIG. 26 follows the SS-TWR of FIG. 24. Therefore, in slot 1 to slot M, the responder device should transmit a response message in consecutive slots. The initiator device may calculate the ToF through the method disclosed in FIG. 24 through two response messages received from the responder device.

In the case of the SS-TWR scheme, which sends response messages twice in succession, ToF may be calculated by correcting CFO, but to transmit response messages twice, slots for transmission of response messages should be consumed two twice as many. As the slots are consumed twice as many, the number of UEs where transmission is relatively delayed may increase, resulting in a fairness issue Further, when the above-described scheme is applied and a contention window (contention period) of the same size is used, airtime congestion may occur due to a decrease in available slots for a contention-based response. In other words, as the second response signal according to the first response signal should be continuously transmitted to transmit messages of the same device in consecutive slots according to the contention-based response message transmission scheme, congestion may occur, increasing a chance of the message transmitted from another device to fail in contention, with the result of a fairness issue.

Referring to FIG. 26, device A and device B may calculate the ToF by a general calculation method when the first response message is transmitted/received. Accordingly, the ToF may be pre-calculated without recognizing the second response message within a predicted range. However, when the second response message is received, CFO correction may be performed by calculating $T_{round2}-T_{round1}$ and $T_{reply2}-T_{reply1}$, so that additional calculation within an unpredicted range is required, causing an increase in device loads and an operation delay.

Therefore, a method for obtaining the ToF by correcting the CFO in a more efficient way is described with reference to the following embodiments.

Figure 27:
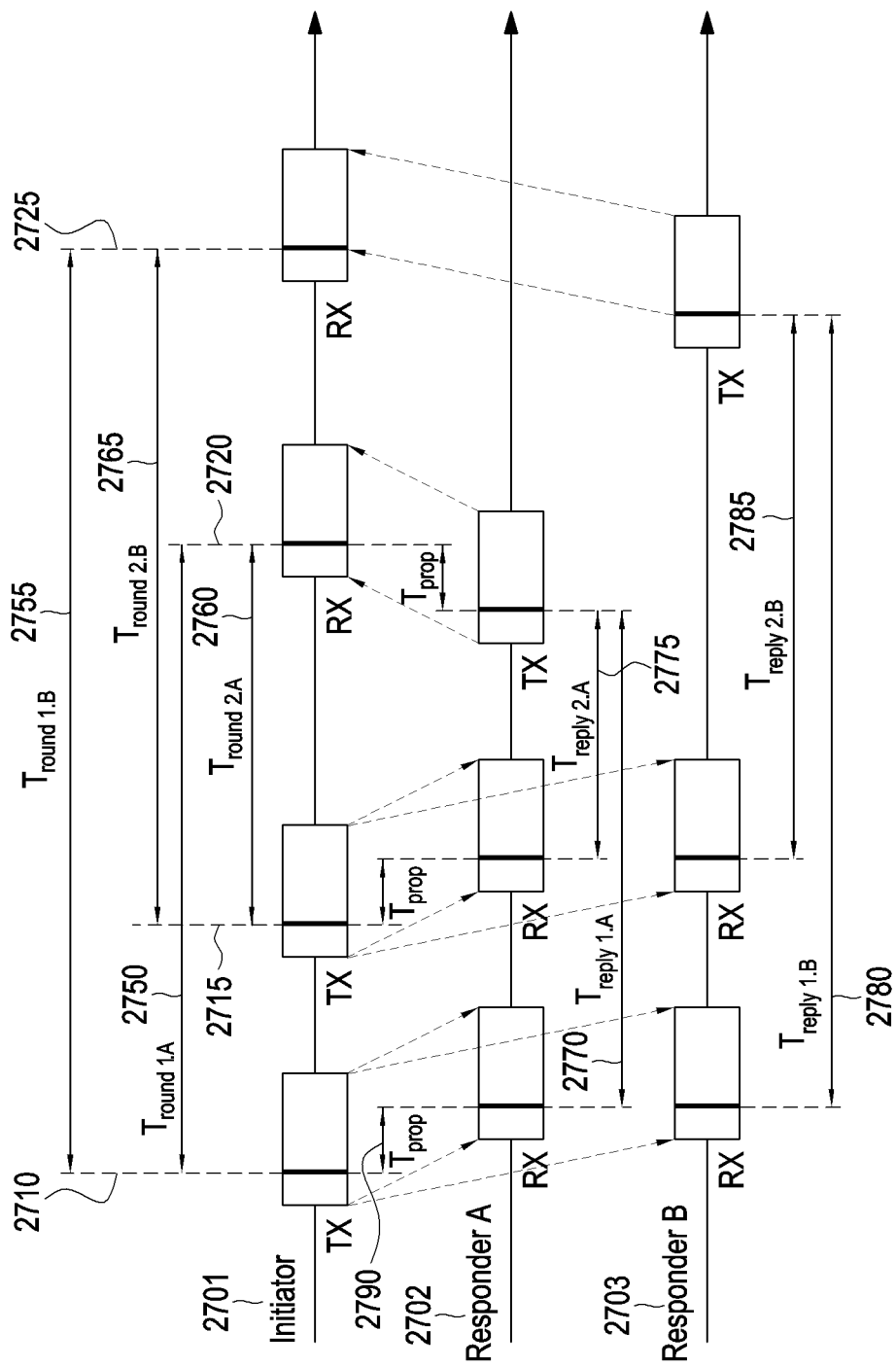
FIG. 27 is a view illustrating an enhanced SS-TWR method according to an embodiment of the disclosure.

FIG. 27 is a view illustrating an enhanced SS-TWR method according to an embodiment of the disclosure.

The device according to the embodiment of FIG. 27 may be an example of the UWB device of FIG. 1.

Since it is frequent that one initiator device connects to multiple responder devices in contention-based ranging, it may be more efficient in terms of load distribution or resource savings for the initiator device to send a message that may be used for CFO correction twice, using a message for ranging initiation or other messages than successively sending twice the response message described in connection with FIGS. 24 to 26.

In SS-TWR, the initiator device 2701 may transmit a ranging initiation message or a configuration message (CM), and the responder devices 2702 and 2703 may send a response for ranging. The configuration message may be a message for configuring parameters of devices related to ranging. Here, the initiator device 2701 may transmit a message (e.g., RIM, CM, or control message) for ranging to the responder devices 2702 and 2703 successively twice. Each device may precisely time-stamp the transmission/reception times of message frames and may calculate $T_{prop}$ which is the ToF value by calculating half the time obtained by subtracting the reply time $T_{reply}$ which indicates the time from the time of reception of the RIM (or CM) from the initiator device by the responder device to the time of transmission of the response message from $T_{round}$ which indicates the time from the time of transmission of the RIM (or CM) of the initiator device 2701 to the time of reception of the response message from the responder device 2702 or 2703.

In the case of FIG. 27, since the initiator device sends the ranging-related message twice, $T_{round1}$ 2750 or 2755 which is related to the first ranging signal and $T_{round2}$ 2760 or 2765 which is related to the second ranging signal may be determined. Further, since there may be two times of reception of the ranging-related message by the responder device, $T_{reply1}$ 2770 or 2780 for the first ranging signal and $T_{reply2}$ 2775 or 2785 for the second ranging signal may be determined. Here, the ToF 2790 may be calculated by correcting the CFO as in the equation below, using $T_{round1}-T_{round2}$ and $T_{reply1}-T_{reply2}$.

$$\hat{T}_{prop} = \frac{1}{2}[T_{round1} - \delta \cdot T_{reply1}] \qquad \text{Equation 5}$$

Here, δ is a CFO correction coefficient and may be expressed as in the following equation.

$$\delta = \frac{T_{round1} - T_{round2}}{T_{reply1} - T_{reply2}} \qquad \text{Equation 6}$$

Referring to FIG. 27, the initiator device 2701 may transmit a message for first ranging and a message for second ranging to responder device A 2702 and responder device B 2703. Here, the message for first ranging (or first ranging signal) may include at least one message among the RIM sent by the initiator device 2701, the CM, the control message, the pilot message that plays the same role as the RIM, and the ranging-related message (e.g., RIM, RRM, ranging final message (RFM), measurement report message (MRM), resource release request message (RRRM), or computational representational understanding of mind (CRUM)). The message for second ranging (or second ranging signal) may include at least one message among the RIM sent by the initiator device 271, the control message, the pilot message that plays the same role as the RIM, and the ranging-related message (e.g., CM, RIM, RRM, RFM, measurement report message (MRM), RRRM, or CRUM).

Responder device A 2702 and responder device B 2703 receiving the messages for first and second ranging may, after receiving both the messages, transmit a response message to the initiator device 2701. Further, responder device A 2702 may determine reply time $T_{reply1,A}$ 2770 for the first ranging signal and the reply time $T_{reply2,A}$ 2775 for the second ranging signal.

In contention-based ranging, responder device A 2702 may select any slot in the contention period and transmit a response message to the initiator device 2701 in a corresponding slot. Alternatively, in scheduling-based ranging, responder device A 2702 may transmit a response message to the initiator device 2701 in a ranging slot allocated thereto.

In an embodiment, the response message may include information about the reply time $T_{reply1,A}$ 2770 and the reply time $T_{reply2,A}$ 2775. The information about the reply time $T_{reply1,A}$ 2770 and the reply time $T_{reply2,A}$ 2775 included in the response message may be used to correct the CFO in the initiator device 2701.

Upon receiving the response message, the initiator device 2701 may determine $T_{reply1,A}$ 2750 which is related to the first ranging signal transmission time 2710 and the time 2720 of reception of the response message sent by responder device A 2702 and $T_{reply2,A}$ 2760 which is related to the second ranging signal transmission time 2715 and the time 2720 of reception of the response message sent by responder device A. Therefore, to calculate the ToF 2790, a CFO correction factor may be calculated as shown in Equation 7. As an embodiment, the calculation of the CFO correction factor may be performed by the initiator device 2701.

$$\delta = \frac{T_{round1,A} - T_{round2,A}}{T_{reply1,A} - T_{reply2,A}} \qquad \text{Equation 7}$$

Based on the CFO correction factor obtained above, the ToF may be calculated through Equation 8 below.

$$\hat{T}_{prop} = \frac{1}{2}[T_{round1,A} - \delta \cdot T_{reply1,A}] \qquad \text{Equation 8}$$

For responder device B 2703, the ToF 2790 may be calculated using the same method as that for responder device A 2702. The initiator device 2701 may determine $T_{round1,B}$ 2755 which is related to the first ranging signal transmission time 2710 and the time 2725 of reception of the response message sent by responder device B 2702 and $T_{round2,B}$ 2765 which is related to the second ranging signal transmission time 2715 and the time 2726 of reception of the response message sent by responder device B. Further, responder device B 2703 may determine reply time $T_{reply1,B}$ 2780 for the first ranging signal and the reply time $T_{reply2,B}$ 2785 for the second ranging signal.

As an embodiment, information about reply time $T_{reply1,B}$ 2780 and reply time $T_{reply2,B}$ 2785 may be included in the response message transmitted by responder device B 2703. The information about the reply time $T_{reply1,B}$ 2780 and the reply time $T_{reply2,B}$ 2785 included in the response message may be used to correct the CFO in the initiator device 2701.

In this case, time information about responder device B may be reflected in Equations 7 and 8.

FIGS. 28A, 28B, 28C, and 28D are diagrams of message transmission/reception in an enhanced SS-TWR scheme according to various embodiments of the disclosure.

The device according to the embodiment of FIGS. 28A to 28D may be an example of the UWB device of FIG. 1.

A method for transmitting a message for ranging twice in consecutive slots among enhanced SS-TWR methods for transmitting a message for ranging twice by an initiator device as described with reference to FIG. 28 is described with reference to FIGS. 28A to 28D. The above-described method simply uses one more slot than the conventional method and may thus consume fewer slots while further reducing a ranging error.

Referring to FIG. 28A, the initiator device may transmit a ranging initiation message (RIM) (or CM) successively twice. For example, when a first RIM 2801 (or first CM) is transmitted in slot 0, a second RIM 2802 (or second CM) may be transmitted in slot 1. Thereafter, in contention-based ranging, the responder devices may select any slot in the contention period and transmit a response message to the initiator device in a corresponding slot. Alternatively, in scheduling-based ranging, the responder devices may transmit a response message to the initiator device in a ranging slot allocated thereto. Accordingly, the initiator device may receive response messages from responder devices in slots 2 through M. The response message may be transmitted one or more times by the responder device in response to receiving two RIMs. In an embodiment, the response message may include information about the reply time for the first RIM and the reply time for the second RIM. The reply time information included in the response message may be used to correct the CFO by the initiator device.

Upon receiving the response message, the initiator device may derive CFO correction information through the first RIM 2801, the second RIM 2802, and the response message. The CFO correction information may include a time interval between the first RIM transmission time and the second RIM transmission time. If necessary, the initiator device may periodically transmit additional RIMs, minimizing waste of slots and enabling all UEs within a range to receive a plurality of RIMs.

Referring to FIG. 28B, the initiator device may transmit a control message 2803 and immediately transmit a RIM 2804 (or CM) in the next slot. For example, when the control message 2803 is transmitted in slot 0, the RIM 2804 (or CM) may be transmitted in slot 1. The initiator device may derive CFO correction information through the control message 2803 and the RIM 2804. In this case, the control message 2803 may serve as the first RIM of FIG. 28A, and the RIM 2804 may serve as the second RIM of FIG. 28A. Thereafter, the responder devices that have received the control message 2803 and the RIM 2804 may select any slot within the contention period and transmit a response message to the initiator device in the corresponding slot in the case of contention-based ranging. Alternatively, in scheduling-based ranging, the responder devices that have received the control message 2803 and the RIM 2804 may transmit a response message to the initiator device in a ranging slot allocated thereto. For example, the initiator device may receive response messages from responder devices in slots 2 through M.

In an embodiment, the response message may include information about the reply time for the control message 2803 and the reply time for the RIM 2804. The reply time information included in the response message may be used to correct the CFO by the initiator device.

Upon receiving the response message, the initiator device may derive CFO correction information through the control message 2803, the RIM 2804, and the response message. The CFO correction information may include a time interval between the control message transmission time and the RIM transmission time. The control message 2805 does not necessarily have to be sent and may optionally be included.

Referring to FIG. 28C, the initiator device may transmit a control message 2805 and successively transmit two RIMs 2806 and 2807 (or CMs). For example, when the control message 2805 is transmitted in slot 0, the first RIM 2806 (or first CM) may be transmitted in slot 1, and the second RIM 2807 (or second CM) may be transmitted in slot 2. The control message 2805 may include an indicator indicating that the RIM messages are to be successively sent to the responder device. Thereafter, in contention-based ranging, the responder devices may select any slot in the contention period and transmit a response message to the initiator device in a corresponding slot. Alternatively, in scheduling-based ranging, the responder devices may transmit a response message to the initiator device in a ranging slot allocated thereto. In other words, the responder device receiving the plurality of RIMs 2806 and 2807 may transmit the response message in slot 3 to slot M. If necessary, it is possible to periodically transmit additional RIMs, minimizing waste of slots and enabling all UEs within a range to receive a plurality of RIMs. The control message 2805 does not necessarily have to be sent and may optionally be included.

In an embodiment, the response message may include information about the reply time for the first RIM 2806 and the reply time for the second RIM 2807. The reply time information included in the response message may be used to correct the CFO by the initiator device.

Upon receiving the response message, the initiator device may derive CFO correction information through the first RIM 2806, the second RIM 2807, and the response message. The CFO correction information may include a time interval between the first RIM transmission time and the second RIM transmission time. If necessary, the initiator device may periodically transmit additional RIMs, minimizing waste of slots and enabling all UEs within a range to receive a plurality of RIMs.

Referring to FIG. 28D, the initiator device may send a control message 2808, immediately send a RIM 2809 (or CM), and then send a CFO compensation message 2810. The CFO compensation message 2810 may be a message capable of performing a role similar to that of a RIM. The CFO compensation message 2810 may be a pilot signal. For example, when the control message 2808 is transmitted in slot 0, the RIM 2809 may be transmitted in slot 1, and the CFO compensation message 2810 may be transmitted in slot 2. The control message 2808 may include an indicator indicating that the RIM 2809 and the CFO compensation message 2810 are to be successively sent to the responder device. Thereafter, in contention-based ranging, the responder devices may select any slot in the contention period and transmit a response message to the initiator device in a corresponding slot. Alternatively, in scheduling-based ranging, the responder devices may transmit a response message to the initiator device in a ranging slot allocated thereto. Accordingly, the responder device receiving the RIM 2809 and the CFO compensation message 2810 may transmit the response message in slot 3 to slot M. In an embodiment, the response message may include information about the reply time for the RIM 2809 and the reply time for the CFO compensation message 2810. The reply time information included in the response message may be used to correct the CFO by the initiator device.

Upon receiving the response message, the initiator device may derive CFO correction information through the RIM 2809, the CFO compensation message 2810, and the response message. The CFO correction information may include a time interval between the RIM transmission time and the transmission time of the CFO compensation message. If necessary, the initiator device may periodically transmit additional RIMs, minimizing waste of slots and enabling all UEs within a range to receive a plurality of RIMs. The control message 2808 does not necessarily have to be sent and may optionally be included.

In all cases of FIGS. 28A to 28D, ToF calculation may be performed through the equation described in FIG. 27 using the derived CFO correction information.

Figure 29C:
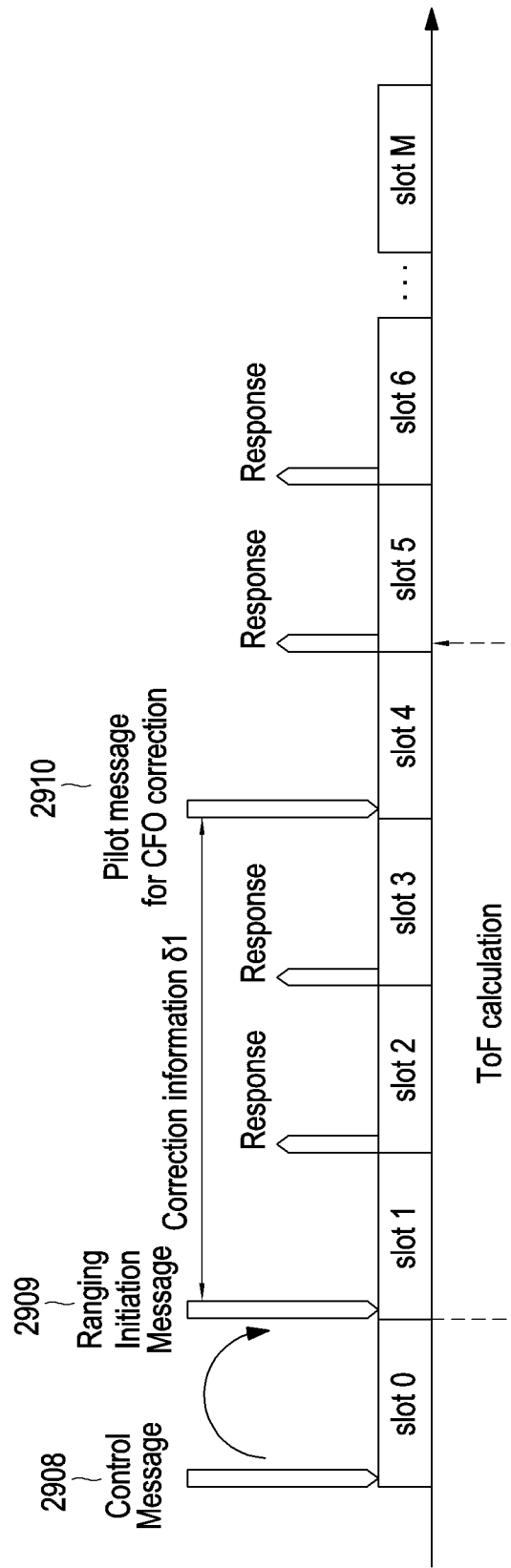

FIGS. 29A, 29B, and 29C are diagrams of message transmission/reception in an enhanced SS-TWR scheme according to various embodiments of the disclosure.

A method for transmitting a message for ranging twice in slots other than consecutive slots, among enhanced SS-TWR methods for transmitting a message for ranging twice by an initiator device is described with reference to FIGS. 29A to 29C.

Referring to FIG. 29A, the initiator device may transmit a control message 2901 and transmit one RIM 2902 (or CM). Thereafter, after receiving a response message from at least one responder device, a ranging final message (RFM) 2903 used to terminate ranging may be transmitted. For example, when the initiator device transmits a control message 2901 in slot 0, it may transmit a RIM 2902 in slot 1 and then receive a response message in slots 2 to 5, and then transmit an RFM 2903 in slot 6. The RFM 2903 may include information indicating to use the RIM 2902 and the RFM 2903 for ToF calculation. In contention-based ranging, the responder devices may select any slot in the contention period and transmit a response message to the initiator device in a corresponding slot. Alternatively, in scheduling-based ranging, the responder devices may transmit a response message to the initiator device in a ranging slot allocated thereto. In an embodiment, the response message may include information about the reply time for the RIM 2902. The reply time information included in the response message may be used to correct the CFO by the initiator device.

The initiator device may derive CFO correction information through the RIM 2902, the RFM 2903, and the response message. The control message may include information for deriving CFO correction information using the RIM 2902 and the RFM 2903. The control message 2901 does not necessarily have to be sent and may optionally be included.

Referring to FIG. 29B, the initiator device may transmit a control message 2904 and transmit one RIM 2905 (or CM). Thereafter, after receiving a response message from at least one responder device, the initiator device may transmit a ranging final message (RFM) 2906 for terminating ranging and transmit a measurement report message (MRM) 2907 for measurement reporting according to the ranging result. For example, when the initiator device transmits a control message 2904 in slot 0, it may transmit a RIM 2905 in slot 1, then receive a response message in slots 2 to 4, then transmit an RFM 2906 in slot 5, and then transmit an MRM 2907 in slot 6. The MRM 2907 may include information indicating to use the RIM 2905 and the MRM 2907 for ToF calculation. The initiator device may derive CFO correction information through the RIM 2905 and the MRM 2907. In contention-based ranging, the responder devices may select any slot in the contention period and transmit a response message to the initiator device in a corresponding slot. Alternatively, in scheduling-based ranging, the responder devices may transmit a response message to the initiator device in a ranging slot allocated thereto. In an embodiment, the response message may include information about the reply time for the RIM 2905. The reply time information included in the response message may be used to correct the CFO by the initiator device.

The control message 2904 may include information for deriving CFO correction information using the RIM 2905 and the MRM 2907. The control message 2904 does not necessarily have to be sent and may optionally be included.

Referring to FIG. 29C, the initiator device may transmit a control message 2908 and transmit one RIM 2909 (or CM). Thereafter, after receiving a response message from at least one responder device, the initiator device may transmit a CFO compensation message 2910 and additionally receive a response message from the responder device. The CFO compensation message 2910 may be a message capable of performing a role similar to that of a RIM. The CFO compensation message 2910 may be a pilot signal. For example, when the initiator device transmits a control message 2908 in slot 0, it may transmit a RIM 2909 in slot 1, then receive a response message in slots 2 and 3, and then transmit a CFO compensation message 2910 in slot 4.

Thereafter, the initiator device may also receive an additional response message. The CFO compensation message may include information indicating that the RIM and the CFO compensation message are to be used for ToF calculation. In contention-based ranging, the responder devices may select any slot in the contention period and transmit a response message to the initiator device in a corresponding slot. Alternatively, in scheduling-based ranging, the responder devices may transmit a response message to the initiator device in a ranging slot allocated thereto. In an embodiment, the response message may include information about the reply time for the RIM 2909 and the reply time for the CFO compensation message 2910. The reply time information included in the response message may be used to correct the CFO by the initiator device.

The initiator device may derive CFO correction information through the RIM 2909, the CFO compensation message 2910, and the response message. The control message 2908 may include information for deriving CFO correction information using the RIM and the CFO compensation message. The control message 2908 does not necessarily have to be sent and may optionally be included.

In all cases of FIGS. 29A to 29C, ToF calculation may be performed through the equation described in FIG. 27 using the derived CFO correction information.

Figure 30:
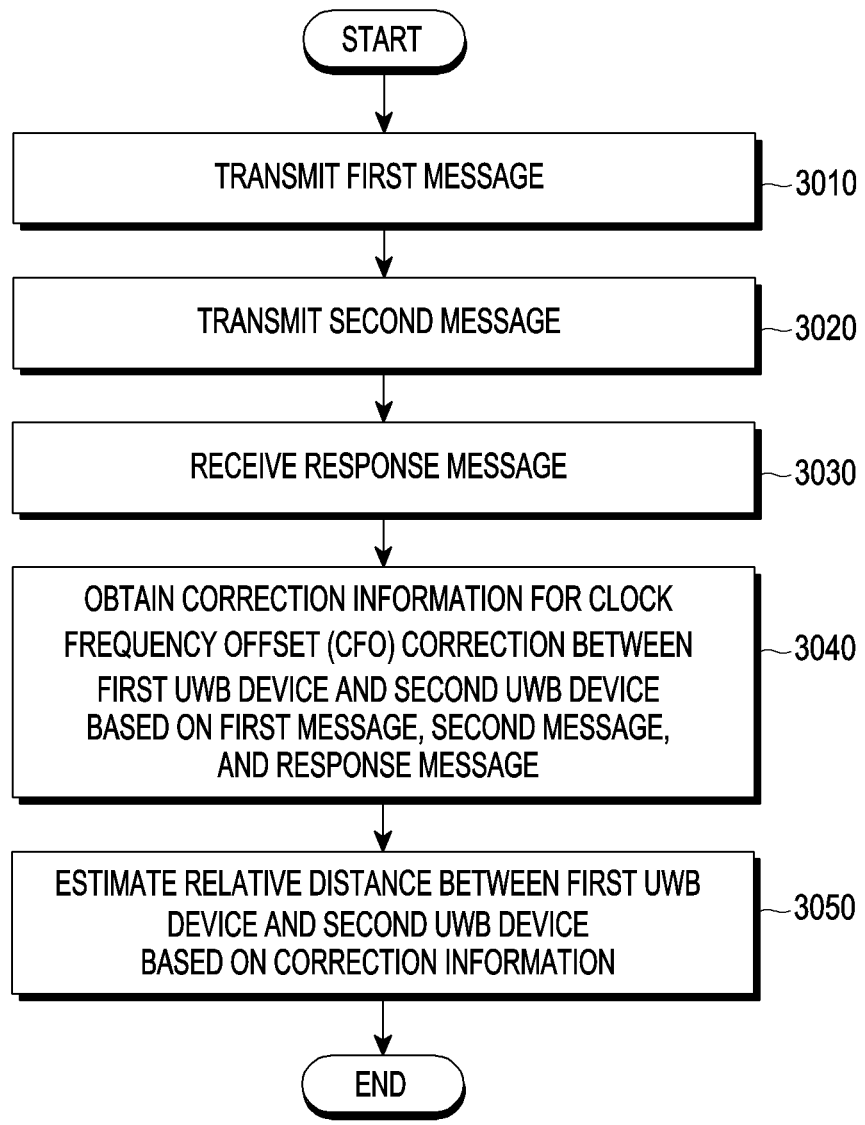
FIG. 30 is a flowchart illustrating a method by a UWB device according to an embodiment of the disclosure.

FIG. 30 is a flowchart illustrating a method by a UWB device according to an embodiment of the disclosure.

Referring to FIG. 30, the UWB device may correspond to the UWB device of FIG. 1, include a UWB device, or may be an electronic device that may include a portion of a UWB device.

In the embodiment of FIG. 30, the UWB device may be an initiator device that serves to initiate ranging. The UWB device may include a transceiver and at least one processor.

The embodiment of FIG. 30 may refer to the description of the method of FIGS. 27, 28A to 28D, and 29A to 29C.

Referring to FIG. 30, the UWB device (first UWB device) may transmit a first message to a second UWB device (3010). The first message may be any one of a ranging initiation message, a configuration message, or a control message.

The first UWB device may transmit a second message to the second UWB device (3020). The second message may be any one of a ranging initiation message, a configuration message, a pilot message, a ranging final message, and a measurement report message.

The first UWB device may receive a response message from the second UWB device (3030). The response message may include at least one of information about a first reply time related to the time of reception of the first message by the second UWB device and the time of transmission of the response message and information about a second reply time related to the time of reception of the second message by the second UWB device and the time of transmission of the response message.

The first UWB device may obtain correction information for clock frequency offset (CFO) correction between the first UWB device and the second UWB device based on the first message, the second message, and the response message (3040). The correction information may be determined based on a first time between the time of transmission of the first message by the first UWB device and the time of reception of the response message, a second time between the time of transmission of the second message and the time of reception of the response message, a third time between the time of reception of the first message by the second UWB device and the time of transmission of the response message, and a fourth time between the time of reception of the second message and the time of transmission of the response message.

The first UWB device may estimate a relative distance between the first UWB device and the second UWB device based on the correction information (3050). The first UWB device may determine a CFO correction factor by dividing the first time minus the second time by the third time minus the fourth time, determine the time of flight (ToF) using the value obtained by subtracting the product of the determined CFO correction factor and the third time from the first time, and estimate the relative distance between the first UWB device and the second UWB device based on the determined ToF.

Figure 31:
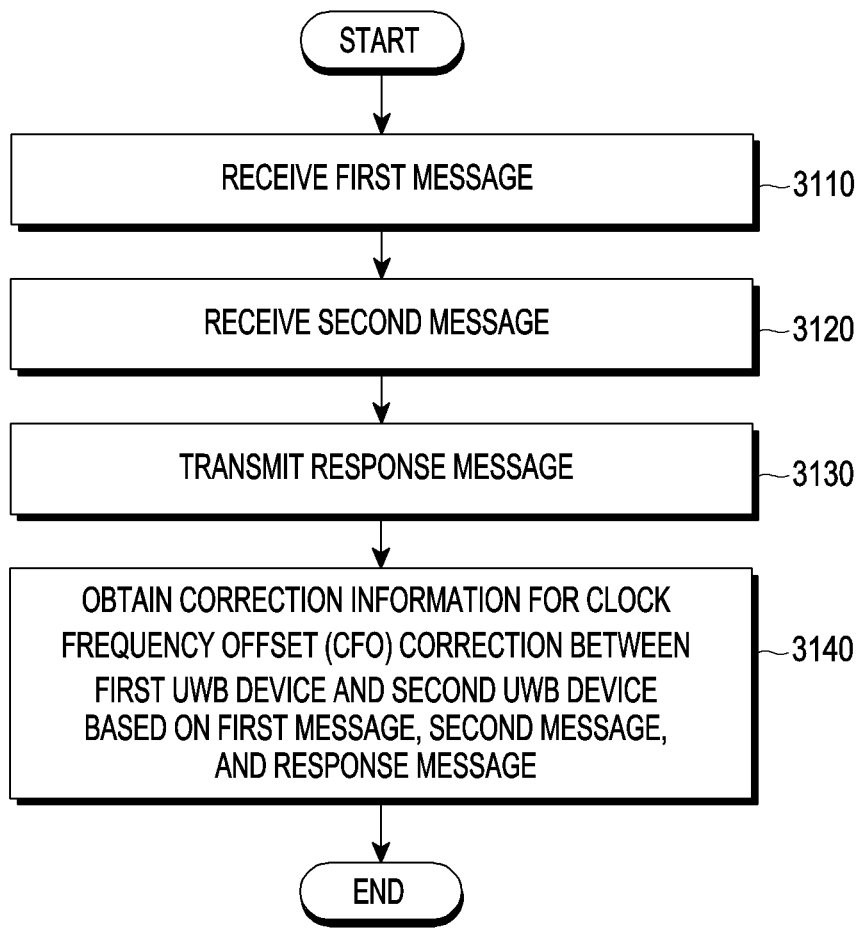
FIG. 31 is a flowchart illustrating a method by a UWB device according to an embodiment of the disclosure.

FIG. 31 is a flowchart illustrating a method by a UWB device according to an embodiment of the disclosure.

Referring to FIG. 31, the UWB device may correspond to the UWB device of FIG. 1, include a UWB device, or may be an electronic device that may include a portion of a UWB device.

In the embodiment of FIG. 31, the UWB device may be a responder device that serves to respond to ranging. The UWB device may include a transceiver and at least one processor.

The embodiment of FIG. 31 may refer to the description of the method of FIGS. 27, 28A to 28D, and 29A to 29C.

Referring to FIG. 31, the UWB device (second UWB device) may receive a first message from the first UWB device (3110). The first message may be any one of a ranging initiation message, a configuration message, or a control message.

The second UWB device may receive a second message from the first UWB device (3120). The second message may be any one of a ranging initiation message, a configuration message, a pilot message, a ranging final message, and a measurement report message.

The second UWB device may transmit a response message from the first UWB device (3130). The response message may include at least one of information about a first reply time related to the time of reception of the first message by the second UWB device and the time of transmission of the response message and information about a second reply time related to the time of reception of the second message by the second UWB device and the time of transmission of the response message.

The second UWB device may obtain correction information for clock frequency offset (CFO) correction between the first UWB device and the second UWB device based on the first message, the second message, and the response message (3140). The correction information may be determined based on a first time between the time of transmission of the first message by the first UWB device and the time of reception of the response message, a second time between the time of transmission of the second message and the time of reception of the response message, a third time between the time of reception of the first message by the second UWB device and the time of transmission of the response message, and a fourth time between the time of reception of the second message and the time of transmission of the response message.

Figure 15:
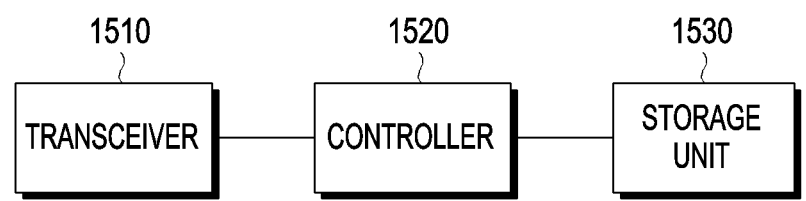
FIG. 15 illustrates a structure of a first UWB device according to an embodiment of the disclosure.

FIG. 15 illustrates a structure of a first UWB device according to an embodiment of the disclosure.

Referring to FIG. 15, the first UWB device may correspond to the UWB device of FIG. 1, include a UWB device, or may be an electronic device that may include a portion of a UWB device.

In the embodiment of FIG. 15, the first UWB device may be a UWB device operating as a controller.

Referring to FIG. 15, the first UWB device may include a transceiver 1510, a controller 1520, and a storage unit 1530. In the disclosure, the controller may be defined as a circuit or application-specific integrated circuit or at least one processor.

The transceiver 1510 may transmit and receive signals to/from another entity.

The controller 1520 may control the overall operation of the electronic device according to an embodiment. For example, the controller 1520 may control inter-block signal flow to perform the operations according to the above-described flowchart. Specifically, the controller 1520 may control, e.g., the operation (e.g., the time block structure configuration operation of the controller) of the first UWB device described with reference to the embodiment of at least one of FIGS. 1, 2, 3A, 3B, 4A, 4B, 5, 6A, 6B, 7, 8A, 8B, 9 to 14, 17 to 27, 28A to 28D, 29A to 29C, 30, and 31.

The storage unit 1530 may store at least one of information transmitted/received via the transceiver 1510 and information generated via the controller 1520. For example, the storage unit 1530 may store information and data necessary for the method described above with reference to the embodiment of at least one of FIGS. 1, 2, 3A, 3B, 4A, 4B, 5, 6A, 6B, 7, 8A, 8B, 9 to 14, 17 to 27, 28A to 28D, 29A to 29C, 30, and 31.

Figure 16:
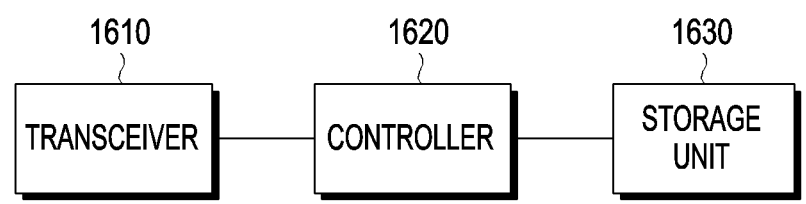
FIG. 16 illustrates a structure of a second UWB device according to an embodiment of the disclosure.

FIG. 16 illustrates a structure of a second UWB device according to an embodiment of the disclosure.

Referring to FIG. 16, the first UWB device may correspond to the UWB device of FIG. 2, include a UWB device, or may be an electronic device that may include a portion of a UWB device.

In the embodiment of FIG. 16, the second UWB device may be a UWB device operating as a controlee.

Referring to FIG. 16, the second UWB device may include a transceiver 1610, a controller 1620, and a storage unit 1630. In the disclosure, the controller may be defined as a circuit or application-specific integrated circuit or at least one processor.

The transceiver 1610 may transmit and receive signals to/from another entity.

The controller 1620 may control the overall operation of the electronic device according to an embodiment. For example, the controller 1620 may control inter-block signal flow to perform the operations according to the above-described flowchart. Specifically, the controller 1620 may control, e.g., the operation (e.g., the time block structure configuration operation of the controlee) of the first UWB device described with reference to the embodiment of at least one of FIGS. 1, 2, 3A, 3B, 4A, 4B, 5, 6A, 6B, 7, 8A, 8B, 9 to 14, 17 to 27, 28A to 28D, 29A to 29C, 30, and 31.

The storage unit 1630 may store at least one of information transmitted/received via the transceiver 1610 and information generated via the controller 1620. For example, the storage unit 1630 may store information and data necessary for the method described above with reference to the embodiment of at least one of FIGS. 1, 2, 3A, 3B, 4A, 4B, 5, 6A, 6B, 7, 8A, 8B, 9 to 14, 17 to 27, 28A to 28D, 29A to 29C, 30, and 31.

Meanwhile, if necessary, a narrow band (NB) may be used to assist UWB. For example, an NB may be used to assist multi-millisecond (MMS) UWB, which may be referred to as narrow band assisted (NBA)-MMS UWB.

The MMS UWB may be a mode in which multiple fragments/packets are transmitted through UWB at, at least, 1 millisecond (ms) intervals to enhance link budget and ToF accuracy. Here, the transmission interval of multiple fragments/packets is not limited to a specific length. For example, each fragment (or UWB packet including each fragment) may be multi-transmitted through UWB at intervals of 1 ms. These multiple fragments/packets may be used for UWB ranging (e.g., SS-TWR, DS-TWR, etc.).

As an embodiment, the fragment/packet used for MMS UWB may include, but is not limited to, a ranging sequence fragment (RSF) or a ranging integrity fragment (RIF). According to an embodiment, the RSF may be generated based on a preset multi-millisecond ranging sequence (MMRS) or may be generated based on a preset preamble sequence (e.g., a sequence used to configure the SYCN field (preamble) of the UWB packet). As an embodiment, the RIF may be generated based on the STS. In the disclosure, in the MMS UWB (or NBA-MMS UWB), the fragment used for multiple transmissions may be referred to as a UWB fragment.

The NBA-MMS UWB may be a mode in which the MMS UWB is assisted by the NB. For example, in the NBA-MMS UWB, the transfer of synchronization information and/or configuration information for MMS UWB may be performed through the NB rather than the UWB. The synchronization information may include information about frequency synchronization and an initial time (or timing) required for the MMS UWB. The NBA-MMS UWB and the MMS UWB may be one of multi-transmission modes.

In the above-described MMS UWB (or NBA-MMS UWB), it is possible to obtain performance enhancement (e.g., ToF accuracy enhancement) by transmitting the fragment/packet multiple times, but this causes more slots to be occupied. This trade-off between performance enhancement and resource use efficiency may be an important issue in the MMS UWB (or NBA-MMS UWB). In particular, in a dense area, such a tradeoff may be critical.

Meanwhile, the above-described hyper-block structure may be used as one of methods for increasing efficiency of resource use in MMS UWB (or NBA-MMS UWB) due to flexibility in the configuration of the corresponding structure. Hereinafter, an example in which the above-described hyper-block structure is used for MMS UWB (or NBA-MMS UWB) is described. The description related to the hyper-block structure may refer to the description related to the hyper-block structure of FIGS. 1, 2, 3A, 3B, 4A, 4B, 5, 6A, 6B, 7, 8A, 8B, 9 to 14, and 17 to 19.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a controller in a communication system supporting ranging, the method comprising:
generating a ranging control message (RCM) including configuration information for a hyper block; and
transmitting, to at least one controlee, the ranging control message,
wherein the hyper block includes a plurality of ranging blocks corresponding to a plurality of block configurations.

2. The method of claim 1,
wherein each of the plurality of ranging blocks includes at least one round, and
wherein each of the at least one round includes at least one slot.

3. The method of claim 2,
wherein block duration, round duration and slot duration for each of the ranging blocks are individually configured.

4. The method of claim 3,
wherein the configuration information includes:
information representing a number of the plurality of ranging blocks in the hyper block, and
wherein the configuration information includes at least one of:
block duration information representing the block duration for each ranging block;
round duration information representing the round duration for the each ranging block; and
slot duration information representing the slot duration for the each ranging block.

5. The method of claim 1, wherein the RCM is repeatedly transmitted by the controller.

6. A controller in a communication system supporting ranging, the controller comprising:
a transceiver; and
at least one processor coupled to the transceiver, and configured to:
generate a ranging control message (RCM) including configuration information for a hyper block, and
transmit, to at least one controlee via the transceiver, the ranging control message,
wherein the hyper block includes a plurality of ranging blocks corresponding to a plurality of block configurations.

7. The controller of claim 6,
wherein each of the plurality of ranging blocks includes at least one round, and
wherein each of the at least one round includes at least one slot.

8. The controller of claim 7,
wherein block duration, round duration and slot duration for each of the ranging blocks are individually configured.

9. The controller of claim 8,
wherein the configuration information includes:
information representing a number of the plurality of ranging blocks in the hyper block, and
wherein the configuration information includes at least one of:
block duration information representing the block duration for each ranging block;
round duration information representing the round duration for the each ranging block; and
slot duration information representing the slot duration for the each ranging block.

10. The controller of claim 6, wherein the processor is configured to repeatedly transmit the RCM.

11. A method performed by a controlee in a communication system supporting ranging, the method comprising:
receiving, from a controller, a ranging control message (RCM) including configuration information for a hyper block; and identifying the hyper block based on the configuration information,
wherein the hyper block includes a plurality of ranging blocks corresponding to a plurality of block configurations.

12. The method of claim 11,
wherein each of the plurality of ranging blocks includes at least one round, and
wherein each of the at least one round includes at least one slot.

13. The method of claim 12,
wherein block duration, round duration and slot duration for each of the ranging blocks are individually configured.

14. The method of claim 13,
wherein the configuration information includes
information representing a number of the plurality of ranging blocks in the hyper block, and
wherein the configuration information includes at least one of:
block duration information representing the block duration for each ranging block;
round duration information representing the round duration for the each ranging block; and
slot duration information representing the slot duration for the each ranging block.

15. The method of claim 11, wherein the RCM is repeatedly received from the controller.

16. A controlee in a communication system supporting ranging, the controlee comprising:
a transceiver; and
at least one processor coupled to the transceiver, and configured to:
receive, from a controller, a ranging control message (RCM) including configuration information for a hyper block, and
identify the hyper block based on the configuration information,
wherein the hyper block includes a plurality of ranging blocks corresponding to a plurality of block configurations.

17. The controlee of claim 16,
wherein each of the plurality of ranging blocks includes at least one round, and
wherein each of the at least one round includes at least one slot.

18. The controlee of claim 17,
wherein block duration, round duration and slot duration for each of the ranging blocks are individually configured.

19. The controlee of claim 18, wherein the configuration information includes
information representing a number of the plurality of ranging blocks in the hyper block, and
wherein the configuration information includes at least one of:
block duration information representing the block duration for each ranging block;
round duration information representing the round duration for the each ranging block; and
slot duration information representing the slot duration for the each ranging block.

20. The controlee of claim 16, wherein the processor is configured to repeatedly receive the RCM from the controller.

* * * * *